US012120623B2

(12) United States Patent
Liberg et al.

(10) Patent No.: US 12,120,623 B2
(45) Date of Patent: Oct. 15, 2024

(54) DETERMINING TIMING ADVANCE VALIDITY IN IDLE MODE

(71) Applicant: TELEFONAKTIEBOLAGET LM ERICSSON (PUBL), Stockholm (SE)

(72) Inventors: Olof Liberg, Enskede (SE); Andreas Höglund, Solna (SE); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 624 days.

(21) Appl. No.: 17/265,161

(22) PCT Filed: Jul. 30, 2019

(86) PCT No.: PCT/IB2019/056513
§ 371 (c)(1),
(2) Date: Feb. 1, 2021

(87) PCT Pub. No.: WO2020/026154
PCT Pub. Date: Feb. 6, 2020

(65) Prior Publication Data
US 2021/0306968 A1 Sep. 30, 2021

Related U.S. Application Data

(60) Provisional application No. 62/712,741, filed on Jul. 31, 2018.

(51) Int. Cl.
*H04W 56/00* (2009.01)
*H04B 17/318* (2015.01)
*H04W 24/10* (2009.01)

(52) U.S. Cl.
CPC ...... *H04W 56/0045* (2013.01); *H04B 17/318* (2015.01); *H04W 24/10* (2013.01)

(58) Field of Classification Search
CPC ... H04L 27/2655; H04L 5/001; H04L 5/0023; H04L 5/0048; H04J 11/0073;
(Continued)

(56) References Cited

U.S. PATENT DOCUMENTS 10,178,592 B2 1/2019 Yang
2007/0149206 A1 6/2007 Wang et al.
(Continued)

FOREIGN PATENT DOCUMENTS

CN 102571297 A 7/2012
CN 102783227 A 11/2012
(Continued)

OTHER PUBLICATIONS

3GPP, "3GPP TS 36.321 V15.2.0", 3rd Generation Partnership Project; Technical Specification Group Radio Access Network; Evolved Universal Terrestrial Radio Access (E-UTRA); Medium Access Control (MAC) protocol specification (Release 15), Jul. 2018, 1-126.
(Continued)

*Primary Examiner* — Rushil P. Sampat

(57) ABSTRACT

Embodiments of methods for providing timing advance change detection are disclosed. In some embodiments, a method performed by a wireless device for determining a validity of a timing advance configuration of the wireless device for an idle mode transmission includes obtaining, while the wireless device is operating in a connected mode, a timing advance value for the wireless device. The method further includes transitioning from the connected mode to an idle mode, and performing a measurement on one or more serving cells of the wireless device while the wireless device is in the idle mode. The method also includes determining whether the timing advance is valid for an idle mode transmission based on the measurement. In some embodi-
(Continued)

ments, the measurement may be a signal strength measurement, such as a Reference Signal Received Power measurement and/or a signal quality measurement such as, a Reference Signal Received Quality measurement.

16 Claims, 14 Drawing Sheets

(58) Field of Classification Search
CPC .......... H04J 11/0076; H04W 56/0005; H04W 56/0045; H04W 56/0055; H04W 74/0833; H04W 24/10; H04B 17/318
See application file for complete search history.

(56) References Cited

U.S. PATENT DOCUMENTS

| | | |
|---|---|---|
| 2009/0290570 A1 | 11/2009 | Kishiyama et al. |
| 2012/0033613 A1 | 2/2012 | Lin et al. |
| 2013/0100938 A1* | 4/2013 | Kwon ................. H04L 27/2655 370/336 |
| 2013/0188516 A1 | 7/2013 | He et al. |
| 2013/0301446 A1 | 11/2013 | Chen et al. |
| 2014/0314057 A1* | 10/2014 | Van Phan ........... H04W 56/001 370/336 |
| 2014/0376422 A1 | 12/2014 | Dai et al. |
| 2015/0215881 A1 | 7/2015 | Parkvall et al. |
| 2016/0227503 A1* | 8/2016 | Dalsgaard ............. H04L 5/0078 |
| 2016/0242133 A1* | 8/2016 | Venkob ............. H04W 56/0045 |
| 2017/0303240 A1 | 10/2017 | Basu Mallick et al. |
| 2018/0199381 A1 | 7/2018 | Rong et al. |
| 2018/0270894 A1* | 9/2018 | Park ...................... H04W 36/02 |
| 2018/0376422 A1 | 12/2018 | Shu et al. |
| 2019/0037425 A1* | 1/2019 | Hong .................... H04W 72/23 |
| 2019/0053158 A1 | 2/2019 | Kumar et al. |
| 2019/0174398 A1 | 6/2019 | Geng et al. |
| 2019/0261233 A1 | 8/2019 | Duan et al. |
| 2020/0107283 A1 | 4/2020 | Ratasuk et al. |
| 2020/0169873 A1 | 5/2020 | Ding et al. |
| 2021/0014864 A1 | 1/2021 | Phuyal et al. |
| 2021/0345395 A1 | 11/2021 | Chatterjee et al. |
| 2021/0360730 A1 | 11/2021 | Kim et al. |
| 2022/0039098 A1 | 2/2022 | Chang et al. |

FOREIGN PATENT DOCUMENTS

| | | |
|---|---|---|
| CN | 103314623 A | 9/2013 |
| CN | 104919883 A | 9/2015 |
| CN | 107211470 A | 9/2017 |
| CN | 107852643 A | 3/2018 |
| CN | 108337728 A | 7/2018 |
| JP | 2008193438 A | 8/2008 |
| JP | 2017005708 A | 1/2017 |
| WO | 2016048431 A1 | 3/2016 |
| WO | 2016182342 A1 | 11/2016 |
| WO | 2017148403 A1 | 9/2017 |
| WO | 2018033260 A1 | 2/2018 |
| WO | 2018070908 A1 | 4/2018 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 15)," 3GPP TS 36.213 V15.2.0, Jun. 2018, 1-541.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.
3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, pp. 1-383.
3GPP, "3rd Generation Partnership Project; Technical Specification Group Radio Access Network; Evolved Universal Terrestrial Radio Access Network (E-UTRAN); X2 application protocol (X2AP) (Release 15)", TS 36.423 V15.4.0, Dec. 2018, 1-408.
Ericsson, "Revised WID: Additional MTC enhancements for LTE", 3GPP TSG RAN Meeting #81 RP-181878, Gold Coast, Australia, Sep. 10-13, 2018, 1-4.
Ericsson, "Support for transmission in preconfigured UL resources in LTE-MTC", 3GPP TSG-RAN WG1 Meeting #94, R1-1808035, Gothenburg, Sweden, Aug. 20-24, 2018, 1-6.
Ericsson, "Support for transmission in preconfigured UL resources in LTE-MTC", 3GPP TSG-RAN WG1 Meeting #94bis, R1-18xxxxx, Chengdu, People's Republic of China, Oct. 8-12, 2018, 1-8.
Ericsson, "Transmission in preconfigured uplink resources", 3GPP TSG-RAN WG2 #103bis, R2-18xxxxx, Chengdu, P.R. China, Oct. 8-12, 2018, 1-8.
Huawei, "Summary of email discussion [99#42][NB-IoT] on SPS options", 3GPP TSG-RAN WG2 Meeting#99bis, R2-1711329, Prague, Czech Republic, Oct. 9-13, 2017, 1-23.
Huawei, "WID revision: Additional enhancements for NB-IoT", 3GPP TSG RAN meeting #81 RP-181674 (revision on RP-181451, Gold Coast, Australia, Sep. 10-13, 2018, 1-4.
Huawei, et al., "Introduction of Subscription based UE differentiation", 3GPP TSG RAN Meeting #81, RP-181839, Gold Coast, Australia, Sep. 10-13, 2018, 1-22.
Huawei, et al., "Introduction of Subscription based UE differentiation", 3GPP TSG RAN Meeting #81, RP-181840, Gold Coast, Australia, Sep. 10-13, 2018, 1-15.
Huawei, et al., "UL transmission in preconfigured resource", 3GPP TSG RAN WG1 Meeting #94, R1-1808118, Gothenburg, Aug. 20-24, 2018, 1-5.
Intel Corporation, "UL transmission in preconfigured resources for eMTC", 3GPP TSG RAN WG1 Meeting #94, R1-1808656, Gothenburg, Sweden, Aug. 20-24, 2018, 1-4.
Intel Corporation, "UL transmission in preconfigured resources for NB-IoT", 3GPP TSG RAN WG1 Meeting #94; R1-1808661; Gothenburg, Sweden, Aug. 20-24, 2018, pp. 1-4.
LG Electronics, "Discussion on preconfigured UL resources in MTC", 3GPP TSG RAN WG1 Meeting #94, R1-1808466, Gothenburg, Sweden, Aug. 20-24, 2018, 1-5.
Nokia et al., "Preconfigured Grant for Uplink transmission", 3GPP TSG RAN WGI Meeting #94; R1-1808440; Gothenburg, Sweden, Aug. 20-24, 2018, pp. 1-4.
Nokia, et al., "Transmission in preconfigured UL resources", 3GPP TSG RAN WG1 Meeting #94, R1-1808431, Gothenburg, Sweden, Aug. 20-24, 2018, 1-4.
NTT DOCOMO, Inc., "UL transmission scheme in preconfigured resources", 3GPP TSG RAN WG1 Meeting #94, R1-1809129, Gothenburg, Sweden, Aug. 20-24, 2018, 1-3.
Qualcomm Incorporated, "Support for transmission in preconfigured UL resources", 3GPP TSG RAN WG1 Meeting #94, R1-1809023, Gothenburg, Sweden, Aug. 20-Aug. 24, 2018, 1-7.
Samsung, "Discussion on transmission in preconfigured UL resources for NB-IOT", 3GPP TSG RAN WG1 Meeting #94; R1-1808738; Gothenburg, Sweden, Aug. 20-24, 2018, pp. 1-5.
Sierra Wireless, "Pre-configured UL Resources Design Considerations", 3GPP TSG RAN WG1 Meeting 94; R1-1808358; Gothenburg, Sweden, Aug. 20-24, 2018, pp. 1-5.
Sierra Wireless; "LTE-M Preconfigured UL Resources Summary", 3GPP TSG RAN WG1 Meeting 94, R1-1809528, Gothenburg, Sweden Aug. 20-24, 2018.
Sony, "Transmission in preconfigured UL resources", 3GPP TSG RAN WG1 Meeting #94; R1-1808348; Gothenburg, Sweden, Aug. 20-24, 2018, pp. 1-4.
ZTE, "Support for transmission in preconfigured UL resources for MTC", 3GPP TSG RAN WG1 Meeting #94, R1-1808632, Gothenburg, Sweden, Aug. 20-24, 2018, 1-4.
Ericsson, "Fixing UE power efficiency", SA WG2 Meeting #128BIS, S2-188438, Aug. 20-24, 2018, Sophia Antipolis, France.
Huawei et al., "Feature lead summary of support for transmission in preconfigured UL resources", 3GPP TSG RAN WG1 Meeting #94, R1-1809571, Gothenburg, Sweden, Aug. 20-24, 2018.

(56) References Cited

OTHER PUBLICATIONS

Qualcomm Incorporated, "Support for transmission in preconfigured UL resources", 3GPP TSG RAN WG1 Meeting #94, R1-1809032, Gothenburg, Sweden, Aug. 20-Aug. 24, 2018.
Ericsson et al., "New WID on Rel-16 enhancements for NB-IoT", 3GPP TSG RAN Meeting #80, La Jolla, USA, Jun. 11-14, 2018, pp. 1-4, RP-181451, 3GPP.
Ericsson, "New WID on Rel-16 MTC enhancements for LTE", 3GPP TSG RAN Meeting #80, La Jolla, USA, Jun. 11-14, 2018, pp. 1-4, RP-181450, 3GPP.
Ericsson, "Support for transmission in preconfigured UL resources in LTE-MTC", 3GPP TSG-RAN WG1 Meeting #94bis, R1-1810186, Chengdu, People's Republic of China, Oct. 8-12, 2018.
Ericsson, "Support for transmission in preconfigured UL resources in NB-IoT", 3GPP TSG-RAN WG1 Meeting #94bis, R1-1810195, Chengdu, People's Republic of China, Oct. 8-12, 2018.
Sierra Wireless, "LTE-M Preconfigured UL Resources Summary RAN1 #95", R1-183725, 3GPP TSG RAN WG1 Meeting #95, Spokane, USA, Nov. 12-16, 2018.

\* cited by examiner

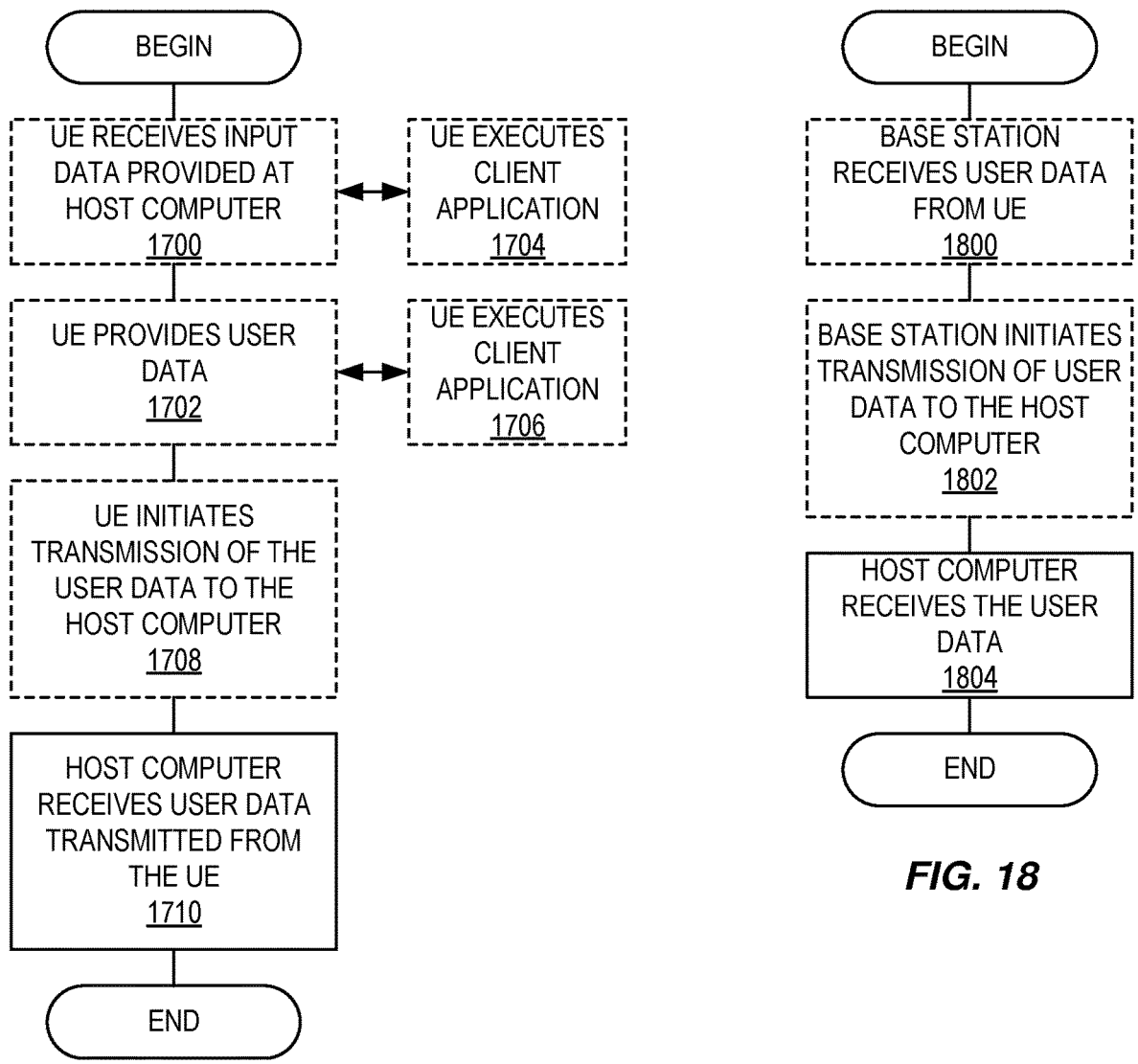

DETERMINING TIMING ADVANCE VALIDITY IN IDLE MODE

RELATED APPLICATIONS

This application a national phase entry of the International Patent Application No. PCT/IB2019/056513, filed Jul. 30, 2019, which claims the benefit of U.S. Provisional Patent Application No. 62/712,741, filed Jul. 31, 2018, the disclosures of which are hereby incorporated herein by reference in their entireties.

TECHNICAL FIELD

The present disclosure relates to Timing Advance (TA) configuration in a cellular communications network.

BACKGROUND

In Release 13, the Third Generation Partnership Project (3GPP) developed Narrowband Internet of Things (NB-IoT) and Long Term Evolution (LTE) Machine Type Communication (MTC) (LTE-M). These new Radio Access Technologies (RATs) provide connectivity to services and applications that demand qualities such as reliable indoor coverage and high capacity, in combination with low system complexity and optimized power consumption.

A pair of new 3GPP work items for NB-IoT and LTE-M Release 16 has been approved in RP-181450 New WID on Rel-16 LTE-MTC [1] and in RP-181451 New WID on Rel-16 NB-IoT [2]. Both contain objectives to improve the uplink transmission efficiency in idle mode for devices holding a valid Timing Advance (TA) configuration.

Before initiating a connection to an LTE-M or NB-IoT network, a device synchronizes its receiver to the downlink frame structure using, e.g., the (Narrowband) Primary Synchronization Signal ((N)PSS) and (Narrowband) Secondary Synchronization Signal ((N)SSS). After sending an uplink (Narrowband) Physical Random Access Channel ((N) PRACH) preamble, the device will receive in response a first downlink message containing a TA command that allows the device to adjust the timing of its transmitter to the uplink frame structure. A TA value of the TA command will correspond to the Round Trip Time (RTT) (i.e., the time it takes a radio wave to travel from the device to the enhanced, or evolved, Node B (eNB) and back). A stationary device can thence be expected to receive the same TA configuration across consecutive connection attempts.

In LTE-M and NB-IoT, a device is expected to obtain a fresh TA configuration every time it makes the transition from an idle mode to a connected mode. More specifically, the eNB measures the time offset for the reception of a first message ("Msg1") preamble for the User Equipment device (UE), and, in the Random Access Response (RAR) in a second message ("Msg2"), the eNB informs the UE of the 'Timing Advance Command' that the UE should apply from that time on for uplink transmissions to be received in sync (see 3GPP Technical Specification (TS) 36.321 for further details). At this point, the UE also starts a timer timeAlignmentTimer and will consider the TA to be valid as long as this timer is running. In idle mode, the system does not expect the devices to maintain a valid TA configuration.

The TA configuration is set with a granularity of ~0.5 microseconds (μs). This implies that the smallest change in distance between the eNB and the device that may trigger an update of the TA configuration corresponds to ~80 meters.

An eNB can tolerate an overall uplink timing error that is in the range of the Cyclic Prefix (CP) used in the transmission of the LTE-M and NB-IoT uplink channels. The LTE normal CP typically used is of a length of 4.7 ms, which implies that a device can at least expect to receive an updated TA configuration after moving ~700 meters closer, or away, from its serving eNB. The LTE specifications also support an extended CP, which is less prone to uplink timing errors at the cost of an increased overhead.

SUMMARY

Systems and methods are disclosed herein for providing timing advance change detection. Embodiments of a method performed by a wireless device for determining a validity of a timing advance configuration of the wireless device for an idle mode transmission are disclosed. In some embodiments, the method comprises obtaining, while the wireless device is operating in a connected mode, a timing advance value for the wireless device. The method further comprises transitioning from the connected mode to an idle mode. The method also comprises performing a measurement on a serving cell of the wireless device while the wireless device is in the idle mode. The method additionally comprises determining whether the timing advance is valid for an idle mode transmission based on the measurement. In some embodiments, the method further comprises performing the idle mode transmission using the timing advance if the timing advance is determined to be valid. In some embodiments, the method further comprises, if the timing advance is determined to not be valid, obtaining a new timing advance value for the wireless device, and performing a transmission using the new timing advance value.

In some embodiments, the measurement is a signal strength measurement. In some embodiments, the measurement is an RSRP measurement. In some embodiments, the measurement is a signal quality measurement. In some embodiments, the measurement is a Reference Signal Received Quality, RSRQ, measurement. In some embodiments, the measurement is a filtered measurement.

In some embodiments, the method further comprises performing, while the wireless device is in the idle mode, one or more measurements on one or more neighbor cells of the wireless device. In such embodiments, determining whether the timing advance is valid for the idle mode transmission comprises determining whether the timing advance is valid for the idle mode transmission based on the measurement on the serving cell made while the wireless device is in the idle mode and the one or more measurements on the one or more neighbor cells made while the wireless device is in the idle mode. In some embodiments, determining whether the timing advance is valid for the idle mode transmission based on the measurement comprises determining whether the timing advance is valid for the idle mode transmission based on a comparison of the measurement and a measurement threshold.

In some embodiments, the method further comprises performing, while the wireless device is in the connected mode, a measurement on the serving cell of the wireless device. In such embodiments, determining whether the timing advance is valid for the idle mode transmission comprises determining whether the timing advance is valid for the idle mode transmission based on the measurement on the serving cell made while the wireless device is in the connected mode and the measurement on the serving cell made while the wireless device is in the idle mode.

In some embodiments, determining whether the timing advance is valid for the idle mode transmission based on the measurement on the serving cell made while the wireless device is in the connected mode and the measurement on the serving cell made while the wireless device is in the idle mode comprises determining whether the timing advance is valid for the idle mode transmission based on a comparison of: (a) a difference between the measurement on the serving cell made while the wireless device is in the idle mode and the measurement on the serving cell made while the wireless device is in the connected mode and (b) a difference threshold.

In some embodiments, the method further comprises performing, while the wireless device is in the connected mode, a measurement on the serving cell of the wireless device. The method also comprises performing, while the wireless device is in the connected mode, measurements on one or more neighbor cells of the wireless device. The method additionally comprises performing, while the wireless device is in the idle mode, measurements on the one or more neighbor cells of the wireless device. In such embodiments, determining whether the timing advance is valid for the idle mode transmission comprises determining whether the timing advance is valid for the idle mode transmission based on the measurement on the serving cell made while the wireless device is in the connected mode, the measurements on the one or more neighbor cells while the wireless device is in the connected mode, the measurement on the serving cell made while the wireless device is in the idle mode, and the measurements on the one or more neighbor cells while the wireless device is in the idle mode.

In some embodiments, the method further comprises providing user data, and forwarding the user data to a host computer via the transmission to a base station.

Embodiments of a wireless device are disclosed. In some embodiments, the wireless device comprises processing circuitry configured to perform any of the steps of any of the above-disclosed methods, and power supply circuitry configured to supply power to the wireless device.

Embodiments of a wireless device are disclosed. In some embodiments, the wireless device comprises processing circuitry adapted to perform any of the steps of any of the above-disclosed methods, and power supply circuitry adapted to supply power to the wireless device.

Embodiments of a User Equipment (UE) are disclosed. In some embodiments, the UE comprises an antenna configured to send and receive wireless signals, and radio front-end circuitry connected to the antenna and to processing circuitry and configured to condition signals communicated between the antenna and the processing circuitry. The processing circuitry is configured to perform any of the steps of any of the above-disclosed methods. The UE further comprises an input interface connected to the processing circuitry and configured to allow input of information into the UE to be processed by the processing circuitry. The UE also comprises an output interface connected to the processing circuitry and configured to output information from the UE that has been processed by the processing circuitry. The UE additionally comprises a battery connected to the processing circuitry and configured to supply power to the UE.

Embodiments of a User Equipment (UE) are disclosed. In some embodiments, the UE comprises an antenna adapted to send and receive wireless signals, and radio front-end circuitry connected to the antenna and to processing circuitry and adapted to condition signals communicated between the antenna and the processing circuitry. The processing circuitry is adapted to perform any of the steps of any of the above-disclosed methods. The UE further comprises an input interface connected to the processing circuitry and adapted to allow input of information into the UE to be processed by the processing circuitry. The UE also comprises an output interface connected to the processing circuitry and adapted to output information from the UE that has been processed by the processing circuitry. The UE additionally comprises a battery connected to the processing circuitry and adapted to supply power to the UE.

Embodiments of a communication system including a host computer are disclosed. The communication system comprises processing circuitry configured to provide user data, and a communication interface configured to forward user data to a cellular network for transmission to a UE. The UE comprises a radio interface and processing circuitry, and the UE's components configured to perform any of the steps of any of the above-disclosed methods. In some embodiments, the cellular network further includes a base station configured to communicate with the UE. In some embodiments, the processing circuitry of the host computer is configured to execute a host application, thereby providing the user data, and the UE's processing circuitry is configured to execute a client application associated with the host application.

Embodiments of a communication system including a host computer are disclosed. The communication system comprises processing circuitry adapted to provide user data, and a communication interface adapted to forward user data to a cellular network for transmission to a UE. The UE comprises a radio interface and processing circuitry, and the UE's components adapted to perform any of the steps of any of the above-disclosed methods. In some embodiments, the cellular network further includes a base station adapted to communicate with the UE. In some embodiments, the processing circuitry of the host computer is adapted to execute a host application, thereby providing the user data, and the UE's processing circuitry is adapted to execute a client application associated with the host application.

Embodiments of a method implemented in a communication system including a host computer, a base station, and a UE are disclosed. The method comprises, at the host computer, providing user data. The method further comprises, at the host computer, initiating a transmission carrying the user data to the UE via a cellular network comprising the base station, wherein the UE performs any of the steps of any of the above-disclosed methods. In some embodiments, the method further comprises, at the UE, receiving the user data from the base station.

Embodiments of a communication system including a host computer are disclosed. The host computer comprises communication interface configured to receive user data originating from a transmission from a UE to a base station. The UE comprises a radio interface and processing circuitry configured to perform any of the steps of any of the above-disclosed methods. In some embodiments, the communication system further includes the UE. In some embodiments, the communication system further includes the base station, wherein the base station comprises a radio interface configured to communicate with the UE and a communication interface configured to forward to the host computer the user data carried by a transmission from the UE to the base station. In some embodiments, the processing circuitry of the host computer is configured to execute a host application, and the UE's processing circuitry is configured to execute a client application associated with the host application, thereby providing the user data. In some embodiments, the processing circuitry of the host computer is configured to execute a host application, thereby providing request data, and the UE's processing circuitry is configured to execute a client application associated with the host application, thereby providing the user data in response to the request data.

Embodiments of a communication system including a host computer are disclosed. The host computer comprises a communication interface adapted to receive user data originating from a transmission from a UE to a base station. The UE comprises a radio interface and processing circuitry adapted to perform any of the steps of any of the above-disclosed methods. In some embodiments, the communication system further includes the UE. In some embodiments, the communication system further includes the base station, wherein the base station comprises a radio interface adapted to communicate with the UE and a communication interface adapted to forward to the host computer the user data carried by a transmission from the UE to the base station. In some embodiments, the processing circuitry of the host computer is adapted to execute a host application, and the UE's processing circuitry is adapted to execute a client application associated with the host application, thereby providing the user data. In some embodiments, the processing circuitry of the host computer is adapted to execute a host application, thereby providing request data, and the UE's processing circuitry is adapted to execute a client application associated with the host application, thereby providing the user data in response to the request data.

Embodiments of a method implemented in a communication system including a host computer, a base station, and a UE are disclosed. The method comprises, at the host computer, receiving user data transmitted to the base station from the UE, wherein the UE performs any of the steps of any of the above-disclosed methods. In some embodiments, the method further comprises, at the UE, providing the user data to the base station. In some embodiments, the method further comprises, at the UE, executing a client application, thereby providing the user data to be transmitted. The method also comprises, at the host computer, executing a host application associated with the client application. In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments of a method implemented in a communication system including a host computer, a base station, and a UE are disclosed. The method comprises, at the host computer, receiving, from the base station, user data originating from a transmission which the base station has received from the UE, wherein the UE performs any of the steps of any of the above-disclosed methods. In some embodiments, the method further comprises, at the base station, receiving the user data from the UE. In some embodiments, the method further comprises, at the base station, initiating a transmission of the received user data to the host computer.

Embodiments of a method performed by a wireless device for determining a validity of a timing advance configuration of the wireless device for an idle mode transmission are disclosed. The method comprises performing a measurement on a serving cell of the wireless device while the wireless device is in the idle mode, and determining whether the timing advance is valid for an idle mode transmission based on the measurement.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 17 is a flowchart illustrating a method implemented in a communication system according to still other embodiments of the present disclosure; and FIG. 18 is a flowchart illustrating a method implemented in a communication system according to yet other embodiments of the present disclosure.

DETAILED DESCRIPTION

Figure 1:
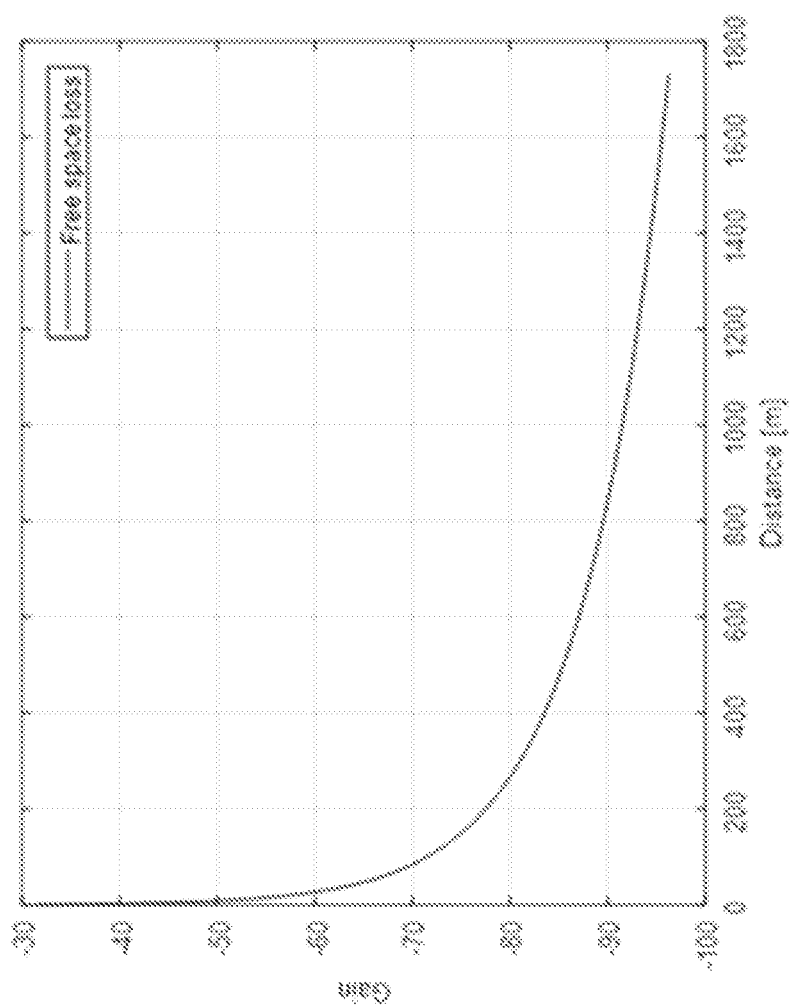
FIG. 1 illustrates the relation of distance between a transmitter and receiver to the loss in signal power correlating to free space loss conditions.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node (s). Some examples of a wireless device include, but are not limited to, an LTE UE, a NB-IoT UE (i.e., a UE that supports NB-IoT), and an LTE-M UE (i.e., a UE that supports LTE-M).

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exists certain challenge(s) present with existing solutions. In particular, the objective of the NB-IoT and LTE-M Release 16 work items requires a device to maintain a valid TA configuration during idle mode so that the device can transmit uplink data in idle mode. However, if UEs transmit in the uplink with incorrect TA, uplink orthogonality may not be maintained, and the uplink system performance is significantly degraded. Functionality to support a valid TA configuration in idle mode is missing and must be specified for the Release 16 Work Item Descriptions (WIDs) to be complete. These challenges, and the solutions disclosed herein, may also apply to LTE and NR in the future.

Certain aspects of the present disclosure and their embodiments may provide solutions to the aforementioned or other challenges. In this regard, it is to be understood that a device that is stationary, or of low mobility, can be expected to experience a limited change in idle mode serving and neighbor cell signal strength. In the present disclosure, embodiments of a device and methods of operation thereof are proposed for determining the validity of the device's most recent TA configuration based on idle mode measurements on the serving cell(s) and, in some embodiments, one or more neighbor cells of the wireless device. These measurements are, in some embodiments, signal strength measurements such as, e.g., Reference Signal Received Power (RSRP) measurements and/or signal quality measurements such as, e.g., Reference Signal Received Quality (RSRQ) measurements.

To support embodiments of the present disclosure, FIG. 1 illustrates the relation of distance between a transmitter and receiver to the loss in signal power correlating to free space loss. Based on this relation, it is clear that a device moving in relation to an eNB will experience a change in recorded RSRP and RSRQ. Embodiments disclosed herein thus provide systems and methods for determining if the most recently acquired TA configuration is still valid or needs to be updated. Such embodiments provide the technical advantage of allowing devices to perform idle mode uplink data transmission in Msg1 with a valid TA, which reduces eNB receiver complexity and negative impact on uplink system performance due to interference.

Figure 2:
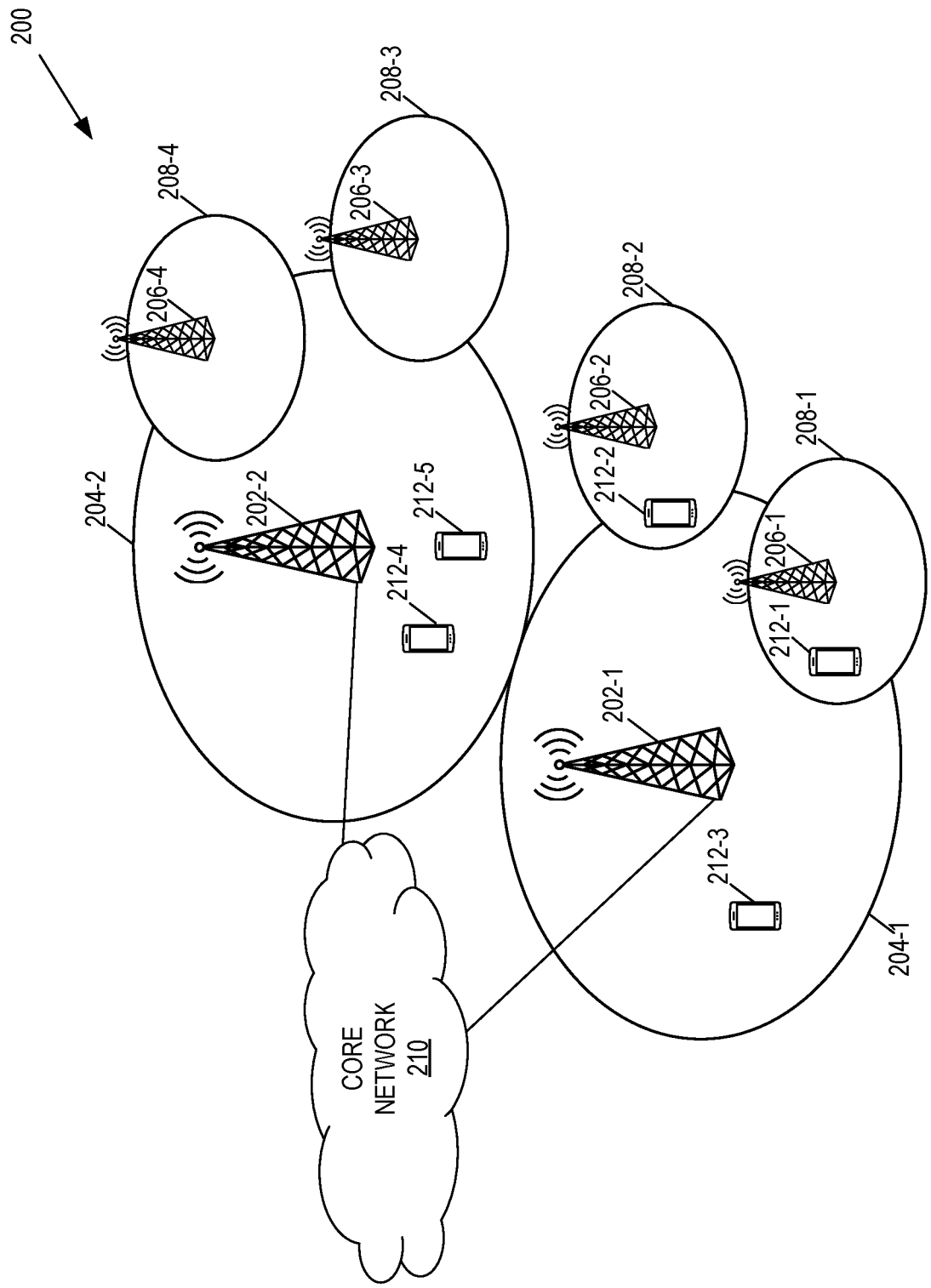
FIG. 2 illustrates one example of a cellular communications network according to some embodiments of the present disclosure.

In this regard, FIG. 2 illustrates one example of a cellular communications network 200 in which embodiments of the present disclosure may be implemented. In the embodiments described herein, the cellular communications network 200 is an LTE network or 5G NR network. The cellular communications network 200 supports one or more radio access technologies. In the preferred embodiments disclosed herein, the radio access technologies supported by the cellular communications network 200 include NB-IoT and/or LTE-M.

In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
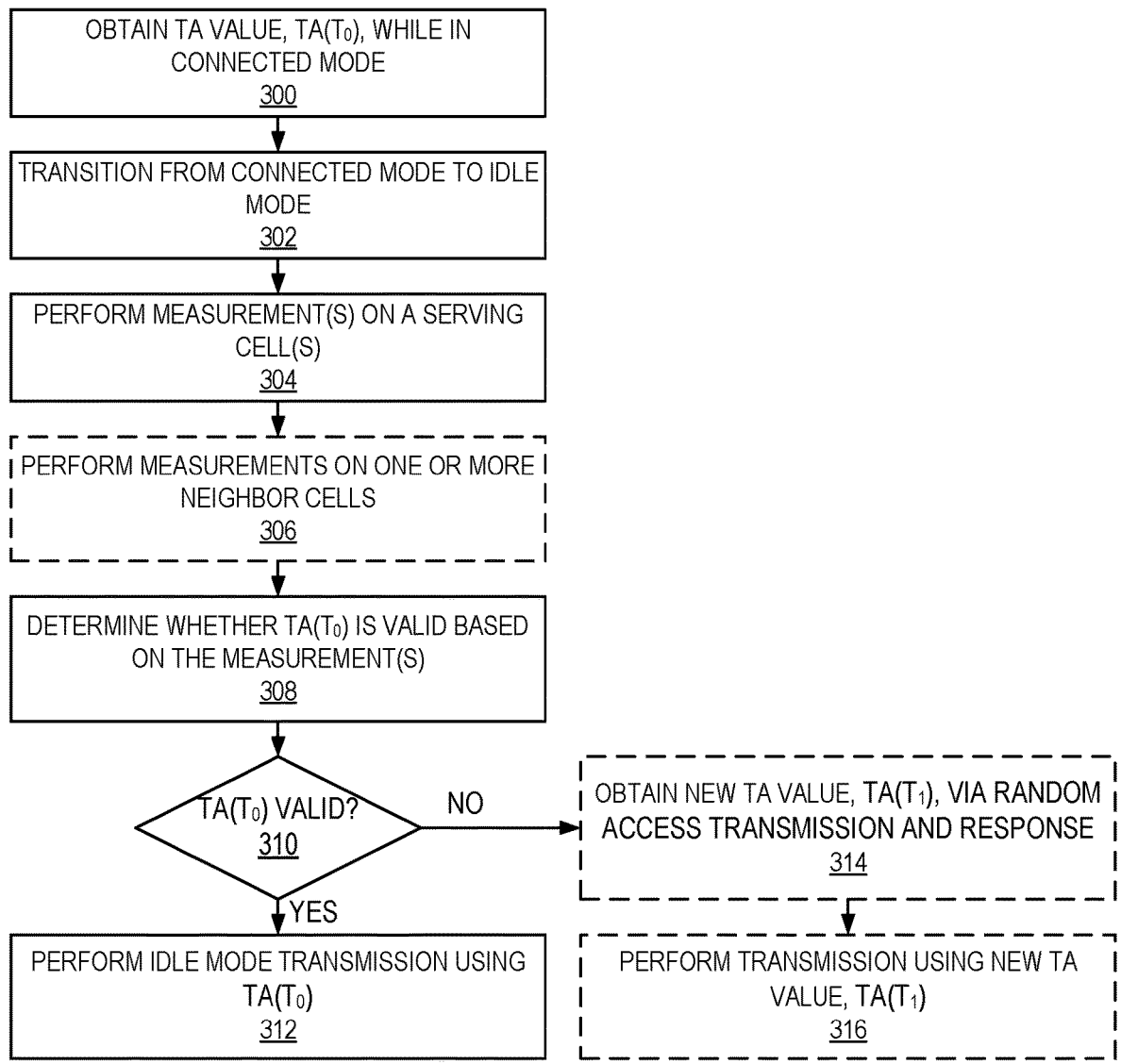
FIG. 3 is a flow chart illustrating the operation of a wireless device according to some embodiments of the present disclosure.

To illustrate the operation of a wireless device 212 in accordance with at least some embodiments of the present disclosure, FIG. 3 is provided. Optional steps in FIG. 3 are represented by dashed lines. As illustrated, the wireless device 212 obtains a TA configuration $TA(T_0)$, at time $T_0$, while the wireless device is in Connected mode (step 300). In some embodiments, the wireless device 212, while in Connected mode, may perform measurements on the serving cell(s) of the wireless device 212 in conjunction with obtaining the TA configuration $TA(T_0)$. Note that a TA configuration may be also be referred to herein as a "TA value." The TA configuration $TA(T_0)$ may be obtained in the conventional manner (i.e., via transmission of a Random Access preamble and subsequent reception of the TA configuration $TA(T_0)$ in a RAR message).

The wireless device 212 transitions from the Connected mode to the Idle mode (step 302). While in Idle mode, one or more higher layers initiate an Idle mode transmission. The wireless device 212 performs one or more measurements on the serving cell(s) of the wireless device 212 while in Idle mode (step 304). The measurement(s) made in step 304 may be made before and/or after initiation of the Idle mode transmission. Further, the measurement(s) may include a signal strength measurement(s) such as, e.g., a RSRP measurement(s) or a signal quality measurement(s) such as, e.g., a RSRQ measurement(s). Optionally, the wireless device 212 may also perform measurements on one or more neighbor cells of the wireless device 212 while in Idle mode (step 306). The measurements made in step 306 may be made before and/or after initiation of the Idle mode transmission. Further, the measurements are preferably signal strength measurements such as, e.g., RSRP measurements or signal quality measurements such as, e.g., RSRQ measurements.

Upon initiation of the Idle mode transmission, the wireless device 212 determines whether the TA value $TA(T_0)$ is still valid based on the measurement(s) made in step 304 and, optionally, the measurements made in step 306 (step 308). For example, in some embodiments, the measurement(s) made on the serving cell is compared to a threshold, and the wireless device 212 determines that the TA value $TA(T_0)$ is valid if the measurement is greater than the threshold, as discussed below in detail. Note that this is only one example. The measurement(s) can be used by the wireless device 212 in any suitable manner to determine whether the TA value $TA(T_0)$ is valid.

If the TA value $TA(T_0)$ is valid (step 310, YES), the wireless device 212 performs the Idle mode transmission using the TA value $TA(T_0)$ (step 312). Optionally, if the TA value $TA(T_0)$ is not valid (step 310, NO), the wireless device 212 obtains a new TA value $TA(T_1)$ via transmission of a Random Access preamble and reception of the new TA value $TA(T_1)$ in a RAR message, e.g., in the conventional manner (step 314) and performs the desired data transmission using the new TA value $TA(T_1)$ (step 316). As will be understood, $T_1$ is a time after $T_0$.

Additional embodiments are described below. Note that while these embodiments are described under different headings, these embodiments may be used separately or combined in any desired manner.

In a first embodiment, at time instance $T_0$, a device (e.g., a wireless device 212) makes the transition from Connected mode to Idle mode holding a valid $TA(T_0)$ configuration, which, e.g., was received as a response to a random access preamble transmission (i.e., as part of a RAR message). The device measures the downlink signal strength $RSRP(T_0)$ of its serving cell, and compares $RSRP(T_0)$ to a configured threshold $RSRP_{TH}$. If $RSRP(T_0) > RSRP_{TH}$, the device takes this as an indication that it is in proximity to the base station (e.g., the base station 202 of its serving cell) and stores the $TA(T_0)$ value.

At a second and subsequent time instance $T_1$, one or more higher layers in the device trigger an Idle mode data transmission. In a first step, the device again measures the absolute signal strength $RSRP(T_1)$ of the serving cell and compares $RSRP(T_1)$ to a predefined or preconfigured signal strength threshold $RSRP_{TH}$. If $RSRP(T_1) > RSRP_{TH}$, the device takes this as an indication that it is still in proximity to the base station and assumes that the stored $TA(T_0)$ value is still valid. In a third step, the device performs the Idle mode data transmission using the stored TA value.

In a first aspect of the first embodiment, if $RSRP(T_1) < RSRP_{TH}$, the device assumes that its $TA(T_0)$ value stored since its most recent RAR message reception is outdated. The device then makes a Random Access preamble transmission to acquire a new valid TA configuration.

In a second aspect of the first embodiment, the strength threshold is a fixed value either configured by system information broadcast dynamically or semi-statically or by dedicated signaling by the network. As an example, in some embodiments, this threshold corresponds to the thresholds below which a cell no longer is suitable, which calls for an update of the TA configuration.

In a third aspect of the first embodiment, filtering could be applied to the subsequent RSRP measurements to rule out any incorrect conclusion caused by temporary deviations.

In a fourth aspect of the first embodiment, signal quality (RSRQ) is used instead of RSRP.

Figure 4:
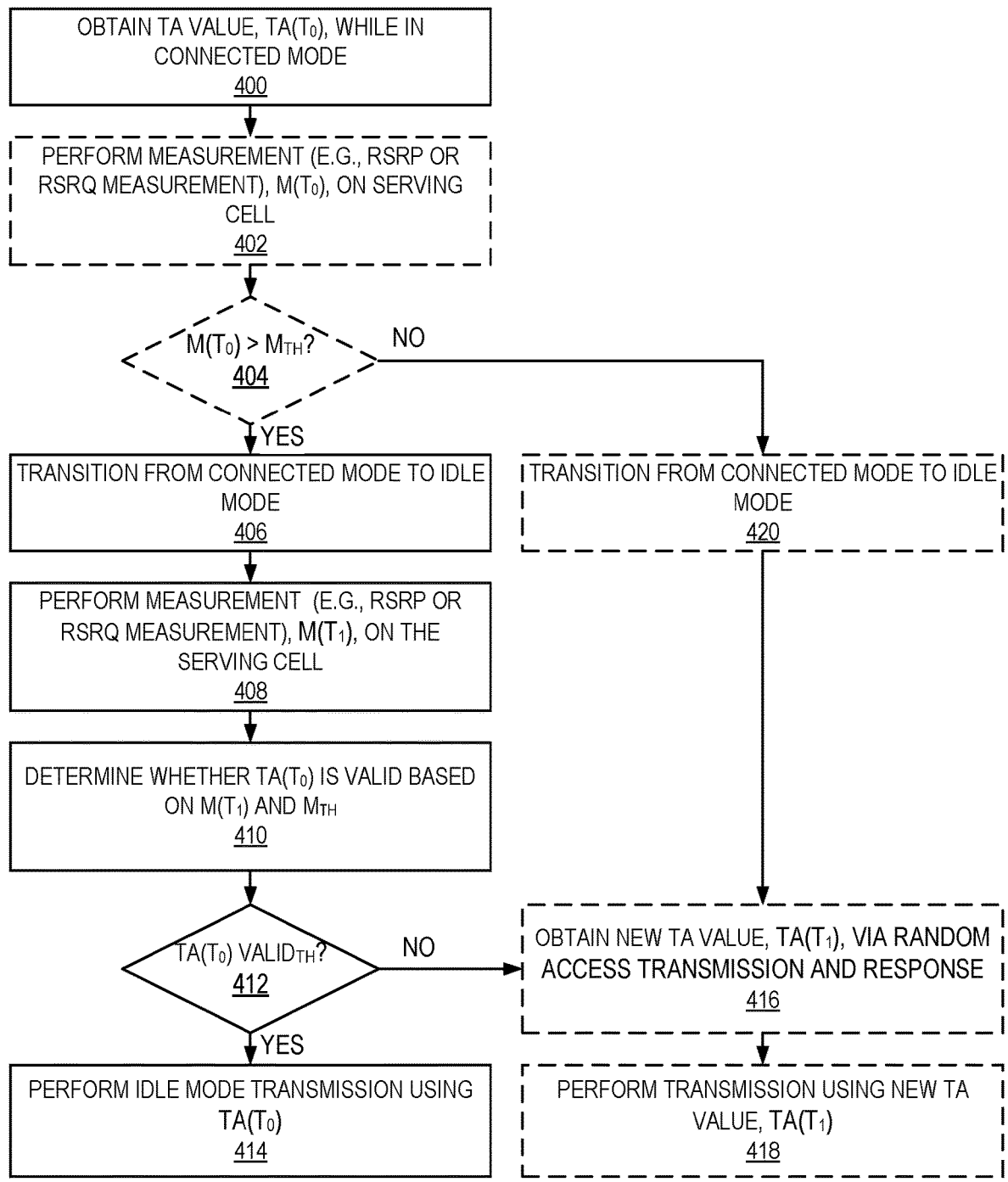
FIG. 4 is a flow chart illustrating the operation of a wireless device according to at least the first embodiment of the present disclosure.

FIG. 4 is a flow chart that illustrates the operation of a wireless device 212 in accordance with at least some aspects of the first embodiment. Optional steps are represented by dashed lines in FIG. 4. As illustrated, at a time $T_0$ while the wireless device 212 is in Connected mode, the wireless device 212 obtains a TA configuration $TA(T_0)$ (step 400). The TA configuration $TA(T_0)$ may be obtained in the conventional manner (i.e., via transmission of a Random Access preamble and subsequent reception of the TA configuration $TA(T_0)$ as a RAR message).

Optionally, the wireless device 212 performs a measurement(s) $M(T_0)$ on the serving cell(s) of the wireless device 212 at time $T_0$ (step 402) and compares the measurement(s) $M(T_0)$ to a threshold $M_{TH}$ (step 404). As discussed above, the measurement $M(T_0)$ may be a signal strength measurement such as, e.g., a RSRP measurement or a signal quality measurement such as, e.g., a RSRQ measurement. The threshold $M_{TH}$ may be predefined or preconfigured by the network. If $M(T_0) > M_{TH}$ (step 404, YES), the wireless device 212 determines that the wireless device 212 is in close proximity of the serving base station 202.

The wireless device 212 transitions from the Connected mode to the Idle mode (step 406). While in Idle mode, one or more higher layers initiate an Idle mode transmission. The wireless device 212 performs a measurement(s) $M(T_1)$ on the serving cell(s) of the wireless device 212 while in Idle mode at a time $T_1$, after $T_0$ (step 408). The measurement $M(T_1)$ may be made before and/or after initiation of the Idle mode transmission. Further, the measurement $M(T_1)$ may be or include a signal strength measurement such as, e.g., a RSRP measurement and/or a signal quality measurement such as, e.g., a RSRQ measurement.

Upon initiation of the Idle mode transmission, the wireless device 212 determines whether the TA configuration $TA(T_0)$ is still valid based on the measurement $M(T_1)$ and the measurement threshold $M_{TH}$ (step 410). For example, in some embodiments, the wireless device 212 compares the measurement $M(T_1)$ to the measurement threshold $M_{TH}$ and determines that the TA configuration $TA(T_0)$ is valid if $M(T_1) > M_{TH}$. As another example, a number of measurements $M(T_1)$ are made and filtered while in Idle mode, where the wireless device 212 compares the filtered measurement to the measurement threshold $M_{TH}$ and determines that the TA configuration $TA(T_0)$ is valid if the filtered measurement is greater than the measurement threshold $M_{TH}$.

If the TA configuration $TA(T_0)$ is valid (step 412, YES), the wireless device 212 performs the Idle mode transmission using the TA configuration $TA(T_0)$ (step 414). Optionally, if the TA configuration $TA(T_0)$ is not valid (step 412, NO), the wireless device 212 may obtain a new TA configuration $TA(T_1)$ via transmission of a Random Access preamble and reception of the new TA configuration $TA(T_1)$ in a RAR message, e.g., in the conventional manner (step 416) and performs the desired data transmission using the new TA configuration $TA(T_1)$ (step 418).

Returning to step 404, if $M(T_0)$ is not greater than $M_{TH}$, the wireless device 212 may optionally transition from Connected mode to Idle mode (step 420) and may proceed to step 416.

Note that while at least some aspects of the first embodiment are explicitly illustrated in FIG. 4, it is to be understood that all of the aspects of the first embodiment described above may be incorporated into the process of FIG. 4.

Figure 5:
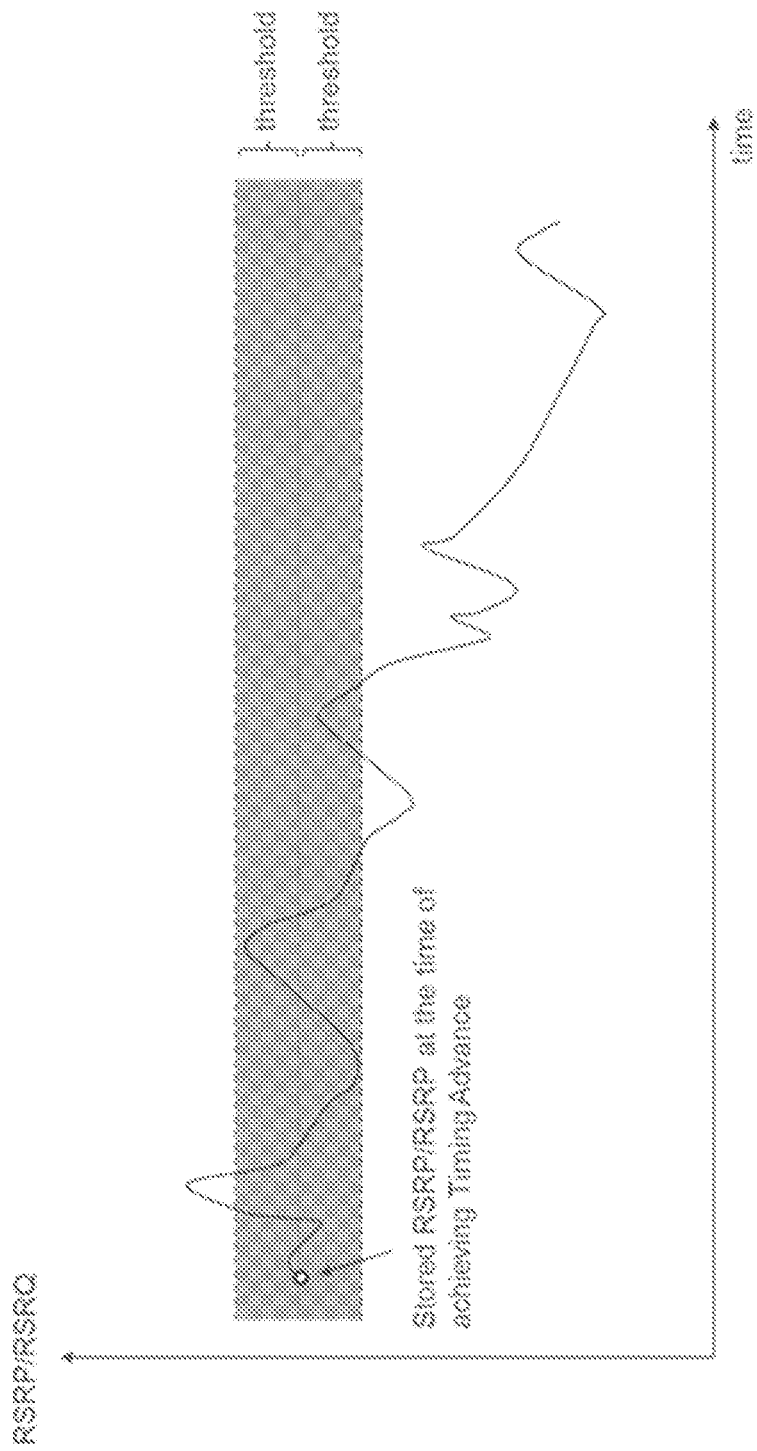
FIG. 5 illustrates a device calculating a change in Reference Signal Received Power (RSRP) values for a serving cell of the device, according to a second embodiment of the present disclosure.

In a second embodiment, the device (e.g., the wireless device 212) calculates a change in RSRP values for the serving cell of the device between a time $T_0$ when the device is in Connected mode and has a valid TA configuration $TA(T_0)$ and a time $T_1$ prior to transmitting Idle mode data (e.g., in Msg1) when in Idle mode. This change in RSRP values is referred to as $dRSRP=RSRP(T_1)-RSRP(T_0)$. The change value dRSRP is seen here as an indication of mobility. If dRSRP is below a configured threshold $dRSRP_{TH}$, the device may assume that its $TA(T_0)$ value stored since its most recent RAR message reception is still valid, and may be used to complete the idle mode data transmission. A graphic illustration of this is shown in FIG. 5.

In some embodiments, the second embodiment is combined with the first embodiment by, e.g., performing steps 416 and 418 if $TA(T_0)$ is determined by both the first and second embodiments to not be valid.

In a first aspect of the second embodiment, if the signal change value $dRSRP=RSRP(T_1)-RSRP(T_0)$ exceeds the threshold $dRSRP_{TH}$, the device assumes that its $TA(T_0)$ value stored since its most recent RAR message reception is outdated. The device therefore makes a Random Access preamble transmission to acquire a new valid TA configuration before attempting data transmission.

In a second aspect of the second embodiment, the strength change threshold $dRSRP_{TH}$ is a fixed value either configured by system information broadcast dynamically or semi-statically or dedicated signaling by the network.

In the third aspect of the second embodiment, the strength change threshold $dRSRP_{TH}$ is a fixed value configured by system information broadcast dynamically or semi-statically plus an offset provided via dedicated signaling by the network. The offset facilitates device specific handling.

In a fourth aspect of the second embodiment, the strength change threshold $dRSRP_{TH}$ is based on a recent estimated difference in signal strength experienced between the serving cell and neighbor cells. This may serve as an indicator for the need to perform a change of serving cell, which calls for an update of the TA configuration.

In a fifth aspect of the second embodiment, filtering could be applied to the subsequent RSRP measurements to rule out any incorrect conclusion caused by temporary deviations. In FIG. 5 for example, the first peak and dip in the signal falling outside the threshold region would not cause the UE to conclude that the stored TA could not be reused. However, when later falling below the threshold region for an extended amount of time, the UE would conclude that its mobility has been great enough that it would not be allowed to reuse to stored TA.

Filtering in time domain, or additional input from, e.g., an accelerometer in the device or measurements on neighbor cells, could be used to avoid scenarios in which measurements indicate an unchanged RSRP due to multiple parameters changing at the same time, i.e., the distance to eNB and shadow fading. Stated differently, filtering or additional input can be used to combat the error case where the UE moves closer to the eNB but at the same time the shadow fading increases, causing RSRP to be the same when the stored TA cannot be applied to achieve uplink synchronization.

In a sixth aspect of the second embodiment, signal quality (RSRQ) is used instead of RSRP.

Figure 6:
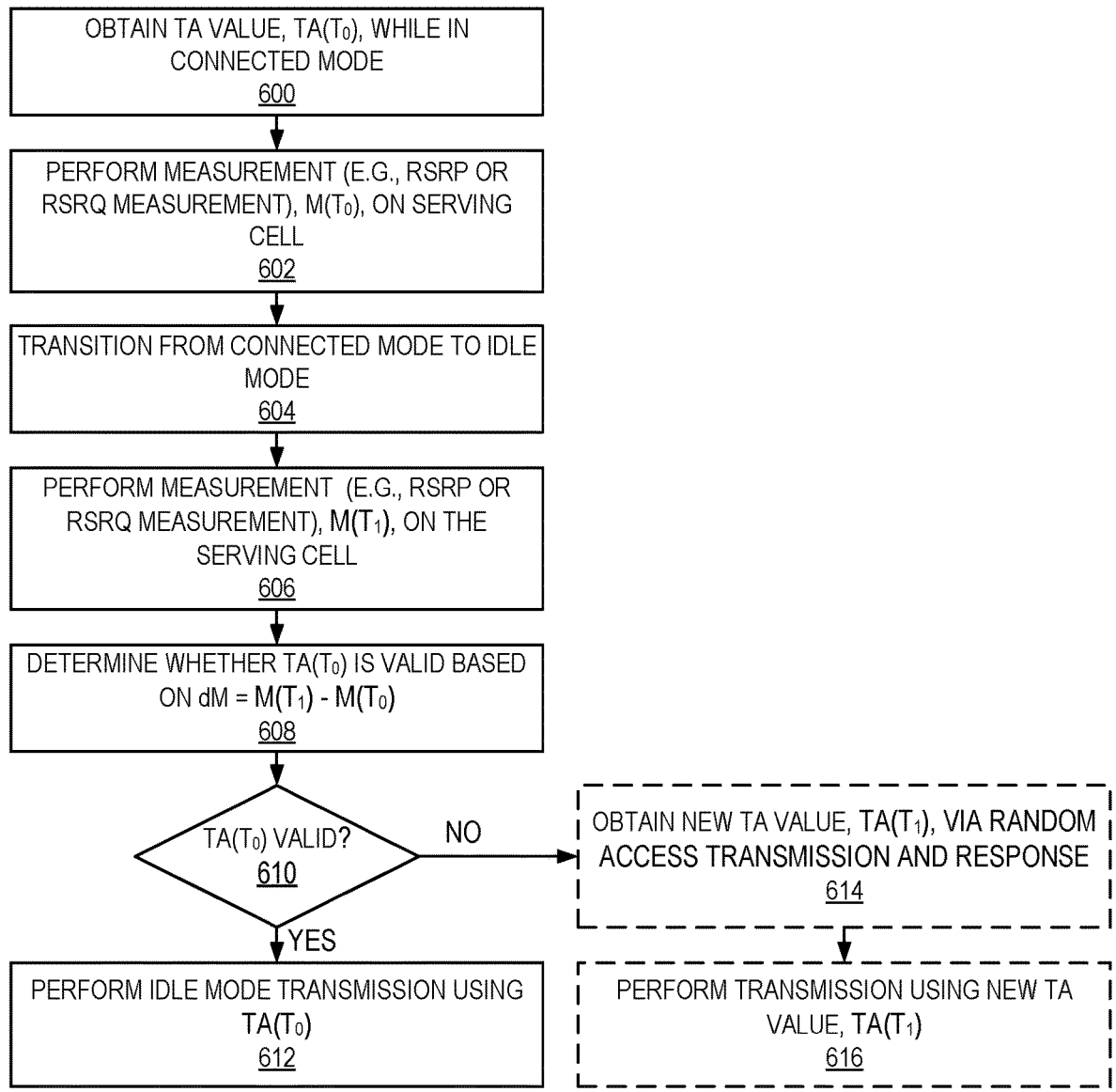
FIG. 6 is a flow chart illustrating the operation of a wireless device in accordance with at least the second embodiment of the present disclosure.

FIG. 6 is a flow chart that illustrates the operation of a wireless device 212 in accordance with at least some aspects of the second embodiment. Optional steps are represented by dashed lines. As illustrated, at a time $T_0$ while the wireless device 212 is in Connected mode, the wireless device 212 obtains a TA configuration $TA(T_0)$ (step 600). The TA configuration $TA(T_0)$ may be obtained in the conventional manner (i.e., via transmission of a Random Access preamble and subsequent reception of the TA configuration $TA(T_0)$ is a RAR message). The wireless device 212 also performs a measurement(s) $M(T_0)$ on the serving cell(s) of the wireless device 212 at time $T_0$ (step 602). As discussed above, the measurement $M(T_0)$ may be a signal strength measurement such as, e.g., a RSRP measurement or a signal quality measurement such as, e.g., a RSRQ measurement.

The wireless device 212 transitions from the Connected mode to the Idle mode (step 604). While in Idle mode, one or more higher layers initiate an Idle mode transmission. The wireless device 212 performs a measurement(s) $M(T_1)$ on the serving cell(s) of the wireless device 212 while in Idle mode at a time $T_1$ (step 606). The measurement $M(T_1)$ may be made before and/or after initiation of the Idle mode transmission. Further, the measurement $M(T_1)$ may be a signal strength measurement such as, e.g., a RSRP measurement and/or a signal quality measurement such as, e.g., a RSRQ measurement.

Upon initiation of the Idle mode transmission, the wireless device 212 determines whether the TA configuration $TA(T_0)$ is still valid based on a difference dM between the measurement $M(T_1)$ and the measurement $M(T_0)$ (step 608). For example, in some embodiments, the wireless device 212 compares the difference dM to the threshold $dM_{TH}$ and determines that the TA configuration $TA(T_0)$ is valid if $dM>dM_{TH}$. As another example, a number of measurements $M(T_1)$ are made and filtered while in Idle mode, where the difference measurement dM is the difference between the filtered measurement $M(T_1)_{filtered}$ and the measurement $M(T_0)$ and the wireless device 212 compares the difference measurement dM to the threshold $dM_{TH}$ and determines that the TA configuration $TA(T_0)$ is valid if $dM>dM_{TH}$.

If the TA configuration $TA(T_0)$ is valid (step 610, YES), the wireless device 212 performs the Idle mode transmission using the TA configuration $TA(T_0)$ (step 612). Optionally, if the TA configuration $TA(T_0)$ is not valid (step 610, NO), the wireless device 212 may obtain a new TA configuration $TA(T_1)$ via transmission of a Random Access preamble and reception of the new TA configuration $TA(T_1)$ in a RAR message, e.g., in the conventional manner (step 614) and performs the desired data transmission using the new TA configuration $TA(T_1)$ (step 616).

Note that while at least some aspects of the second embodiment are explicitly illustrated in FIG. 6, it is to be understood that all of the aspects of the second embodiment described above may be incorporated into the process of FIG. 6.

In a third embodiment, measurements $RSRP(T_0)$ and $RSRP(T_1)$ are performed for a set of neighbor cells $C_1$, $C_2$, ..., $C_M$ in addition to the serving cell, which is denoted here as $C_0$. A signal change value $RSRP(C_X, T_1) - RSRP(C_X, T_0)$, with $X \in \{0, 1, ..., M\}$, is calculated for each of the serving and neighboring cells. In some embodiments, if the max, the mean, the standard deviation, or the variance of the set of calculated signal change values $RSRP(C_X, T_1) - RSRP(C_X, T_0)$ does not exceed a configured threshold, then the device considers its stored $TA(T_0)$ value to be valid to be used for an idle mode data transmission.

In some embodiments, the third embodiment is combined with the first embodiment and/or the second embodiment by, e.g., performing steps 416-418 of FIG. 4 or steps 614-616 of FIG. 6 if $TA(T_0)$ is determined by the first and/or second embodiments as well as the third embodiment to not be valid.

In a first aspect of the third embodiment, if the max, the mean, the standard deviation, or the variance of the set of $RSRP(C_X, T_1) - RSRP(C_X, T_0)$ does exceed the configured threshold, then the device considers its stored $TA(T_0)$ value to be outdated and not valid for use during an idle mode data transmission.

In a second aspect of the third embodiment, signal quality (RSRQ) is used instead of RSRP.

Figure 7:
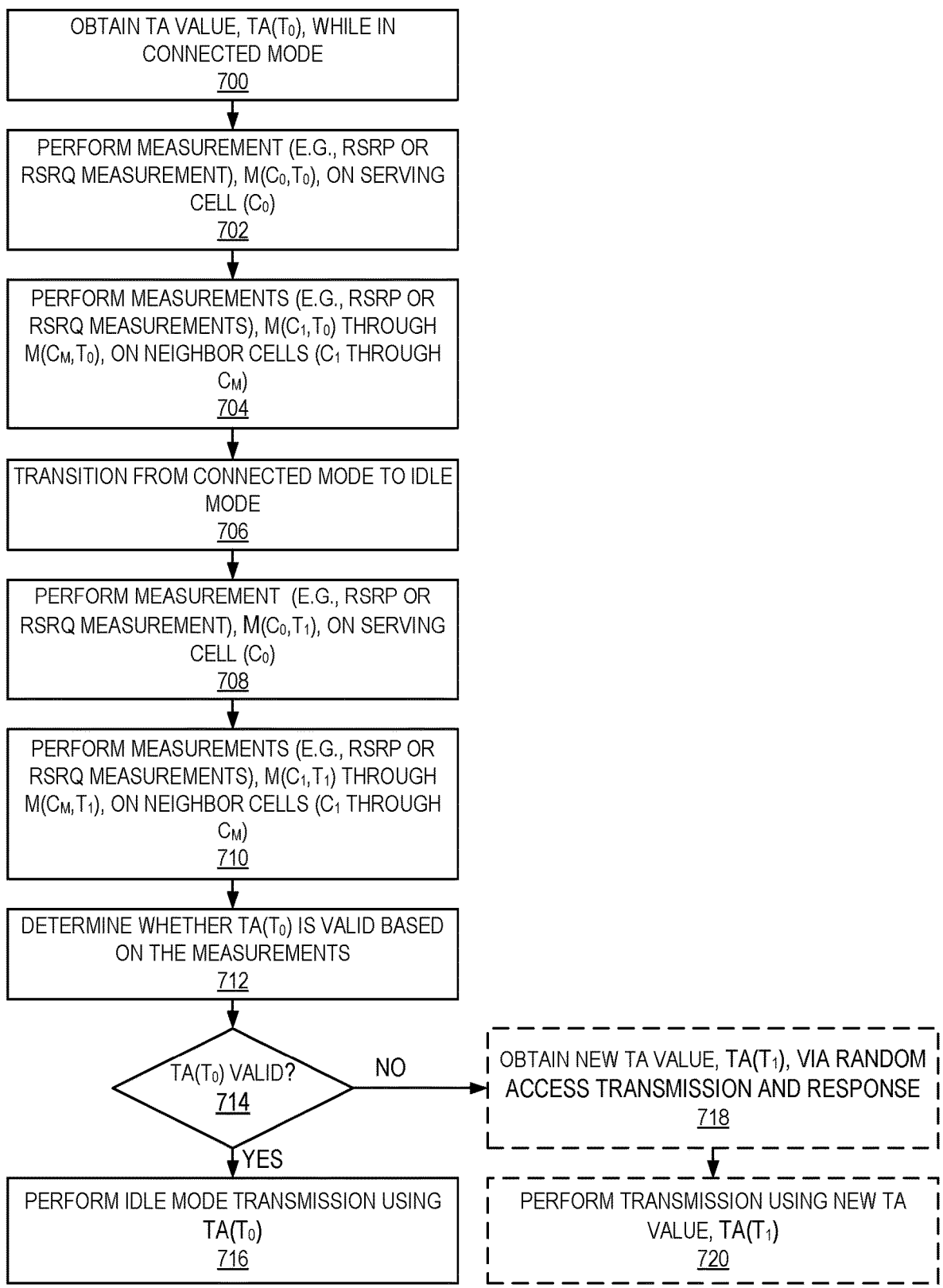
FIG. 7 is a flow chart illustrating the operation of a wireless device in accordance with at least some aspects of a third embodiment of the present disclosure.

FIG. 7 is a flow chart that illustrates the operation of a wireless device 212 in accordance with at least some aspects of the third embodiment. Optional steps are represented by dashed lines. As illustrated, at a time $T_0$ while the wireless device 212 is in Connected mode, the wireless device 212 obtains a TA configuration $TA(T_0)$ (step 700). The TA configuration $TA(T_0)$ may be obtained in the conventional manner (i.e., via transmission of a Random Access preamble and subsequent reception of the TA configuration $TA(T_0)$ is a RAR message). The wireless device 212 also performs a measurement(s) $M(C_0, T_0)$ on the serving cell(s) (where the serving cell is denoted here as $C_0$) of the wireless device 212 at time $T_0$ (step 702). The wireless device 212 also performs measurements $M(C_0, T_0)$ through $M(C_M, T_0)$ on neighbor cells $C_1$ through $C_M$ of the wireless device 212 at time $T_0$ (step 704). As discussed above, each of the measurements $M(C_X, T_0)$, with $X \in \{0, 1, ..., M\}$, may be a signal strength measurement such as, e.g., a RSRP measurement or a signal quality measurement such as, e.g., a RSRQ measurement.

The wireless device 212 transitions from the Connected mode to the Idle mode (step 706). While in Idle mode, one or more higher layers initiate an Idle mode transmission. The wireless device 212 performs a measurement(s) $M(C_0, T_1)$ on the serving cell(s) of the wireless device 212 while in Idle mode at a time $T_1$ (step 708). The wireless device 212 also performs measurements $M(C_1, T_1)$ through $M(C_M, T_1)$ on neighbor cells $C_1$ through $C_M$ of the wireless device 212 at time $T_1$ (step 710). The measurements $M(C_X, T_0)$, with $X \in \{0, 1, ..., M\}$, may be made before and/or after initiation of the Idle mode transmission. Further, each of the measurements $M(C_X, T_0)$, with $X \in \{0, 1, ..., M\}$, may be a signal strength measurement such as, e.g., a RSRP measurement or a signal quality measurement such as, e.g., a RSRQ measurement.

Upon initiation of the Idle mode transmission, the wireless device 212 determines whether the TA configuration $TA(T_0)$ is still valid based on the measurements made in steps 702, 704, 708, and 710 (step 712). For example, for each cell $C_X$, with $X \in \{0, 1, ..., M\}$, the wireless device 212 computes a difference $dM(C_X)$ between the measurement $M(C_X, T_1)$ and the measurement $M(C_X, T_0)$. Then, the wireless device 212 determines that the TA configuration $TA(T_0)$ is valid if, for each cell $C_X$, the difference $dM(C_X)$ is greater than a difference threshold $dM_{TH}$. The difference threshold $dM_{TH}$ may be the same for all of the cells or may vary for different cells. Note that, in some embodiments, the measurements $M(C_X, T_1)$ are filtered while the wireless device 212 is in Idle mode, and the determination in step 712 is based on the respective filtered measurements for each cell $C_X$.

If the TA configuration $TA(T_0)$ is valid (step 714, YES), the wireless device 212 performs the Idle mode transmission using the TA configuration $TA(T_0)$ (step 716). Optionally, if the TA configuration $TA(T_0)$ is not valid (step 714, NO), the wireless device 212 obtains a new TA configuration $TA(T_1)$ via transmission of a Random Access preamble and reception of the new TA configuration $TA(T_1)$ in a RAR message, e.g., in the conventional manner (step 718) and performs the desired data transmission using the new TA configuration $TA(T_1)$ (step 720).

Note that while at least some aspects of the third embodiment are explicitly illustrated in FIG. 7, it is to be understood that all of the aspects of the third embodiment described above may be incorporated into the process of FIG. 7.

Figure 8:
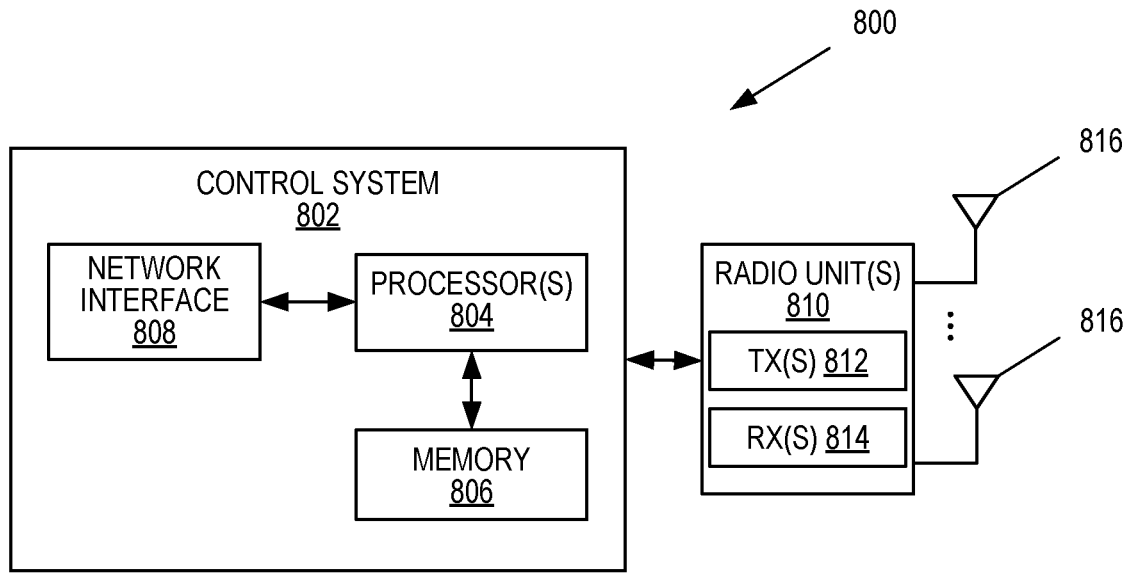
FIG. 8 is a schematic block diagram of a radio access node according to some embodiments of the present disclosure.

FIG. 8 is a schematic block diagram of a radio access node 800 according to some embodiments of the present disclosure. The radio access node 800 may be, for example, a base station 202 or 206. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
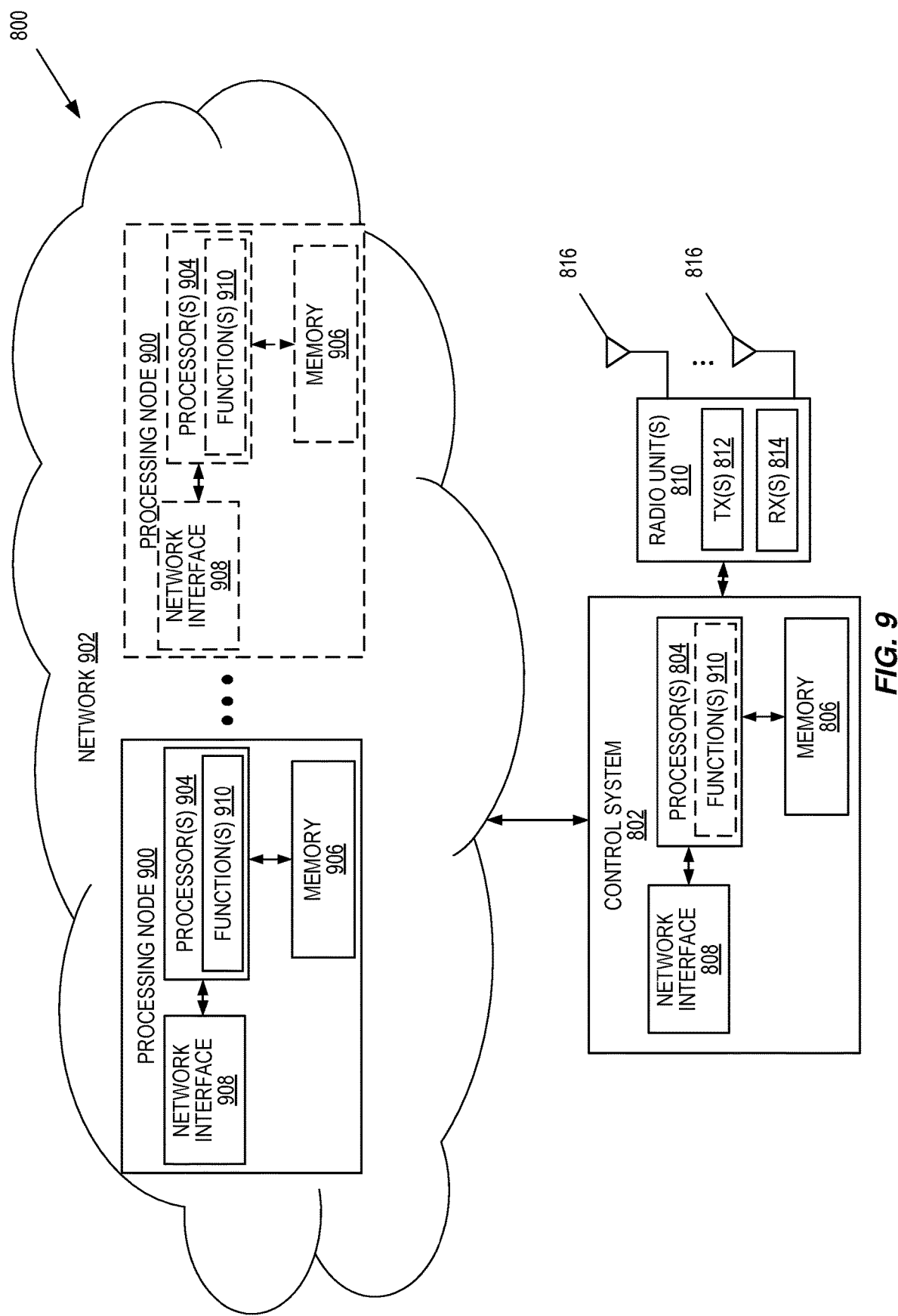
FIG. 9 is a schematic block diagram that illustrates a virtualized embodiment of the radio access node of FIG. 8 according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node (s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, cause the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
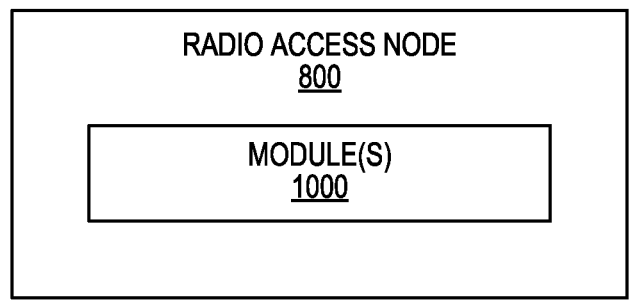
FIG. 10 is a schematic block diagram of a radio access node according to other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9, where the modules 1000 may be implemented at one of the processing nodes 900 or distributed across multiple processing nodes 900 and/or distributed across the processing node(s) 900 and the control system 802.

Figure 11:
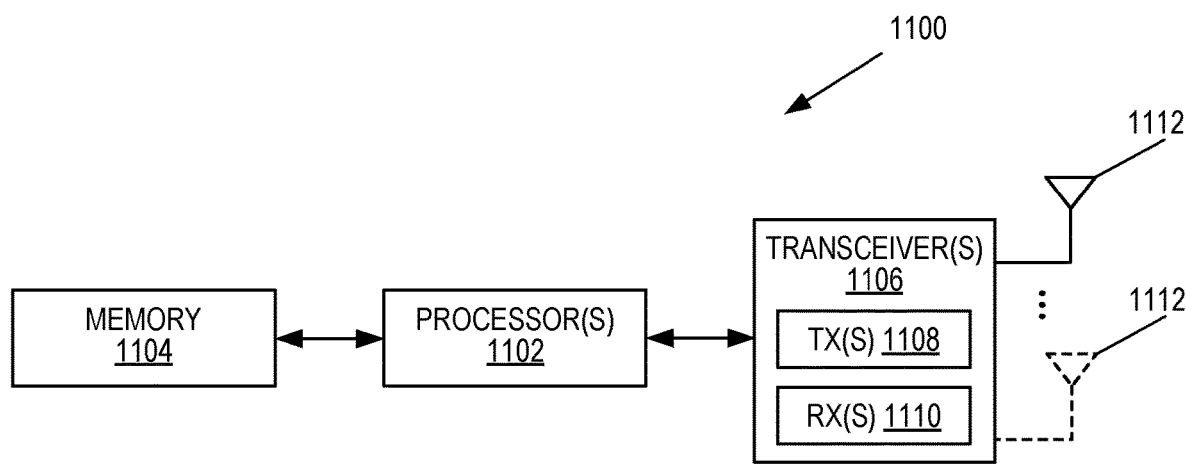
FIG. 11 is a schematic block diagram of a User Equipment (UE) according to some embodiments of the present disclosure.

FIG. 11 is a schematic block diagram of a UE 1100 according to some embodiments of the present disclosure. The UE 1100 may be the wireless device 212 described above. As illustrated, the UE 1100 includes one or more processors 1102 (e.g., CPUs, ASICs, FPGAs, and/or the like), memory 1104, and one or more transceiver(s) 1106 each including one or more transmitter(s) 1108 and one or more receiver(s) 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by one of ordinary skill in the art. The processors 1102 are also referred to herein as processing circuitry. The transceiver(s) 1106 are also referred to herein as radio circuitry. In some embodiments, the functionality of the UE 1100 described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/ output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, cause the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
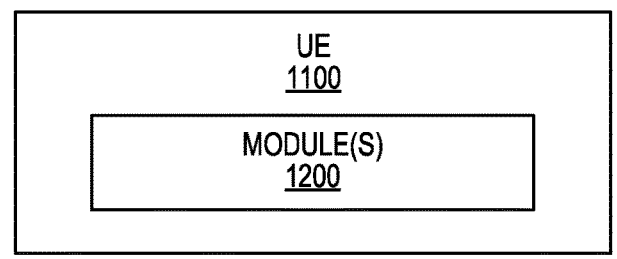
FIG. 12 is a schematic block diagram of a UE according to other embodiments of the present disclosure.

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Figure 13:
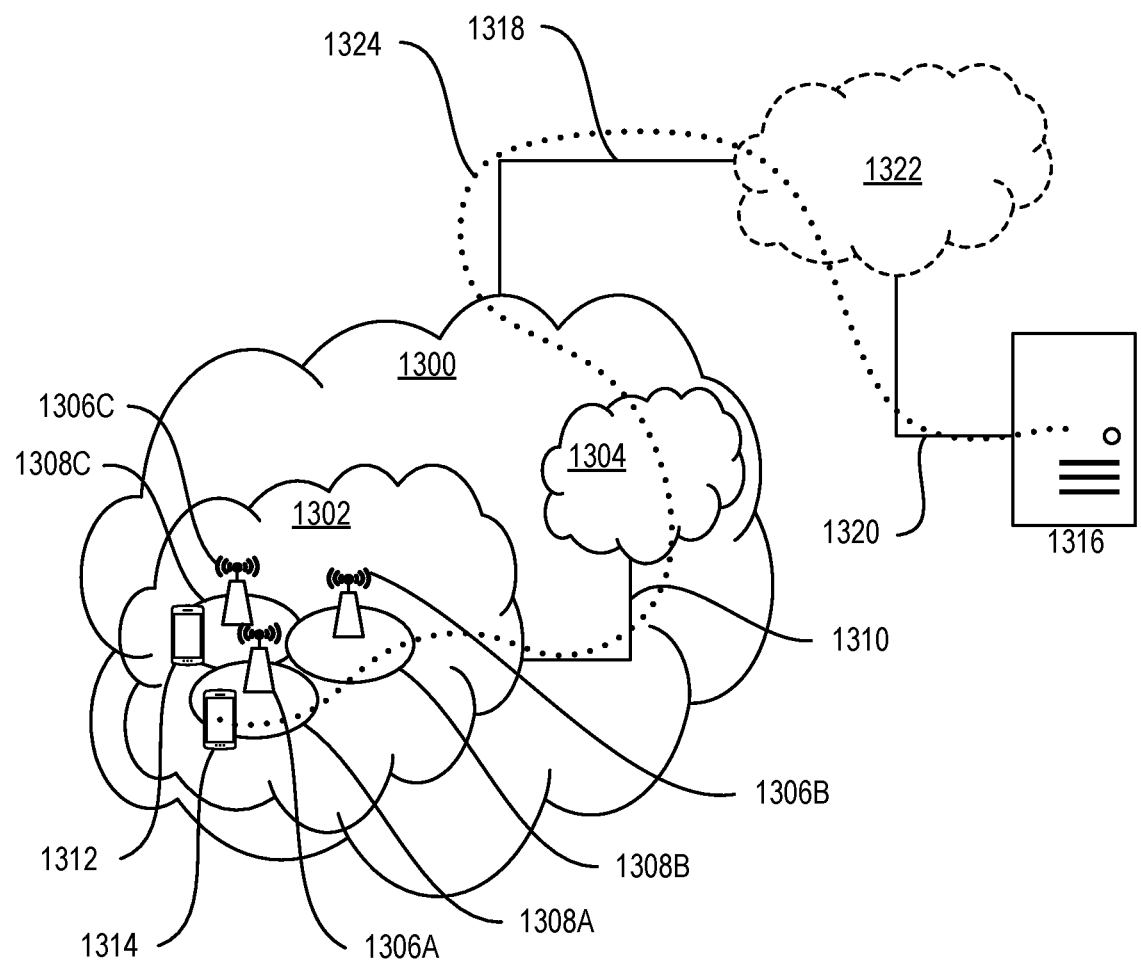
FIG. 13 illustrates a communication system including a telecommunication network according to some embodiments of the present disclosure.

With reference to FIG. 13, in accordance with an embodiment, a communication system includes a telecommunication network 1300, such as a 3GPP-type cellular network, which comprises an access network 1302, such as a Radio Access Network (RAN), and a core network 1304. The access network 1302 comprises a plurality of base stations 1306A, 1306B, 1306C, such as NBs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
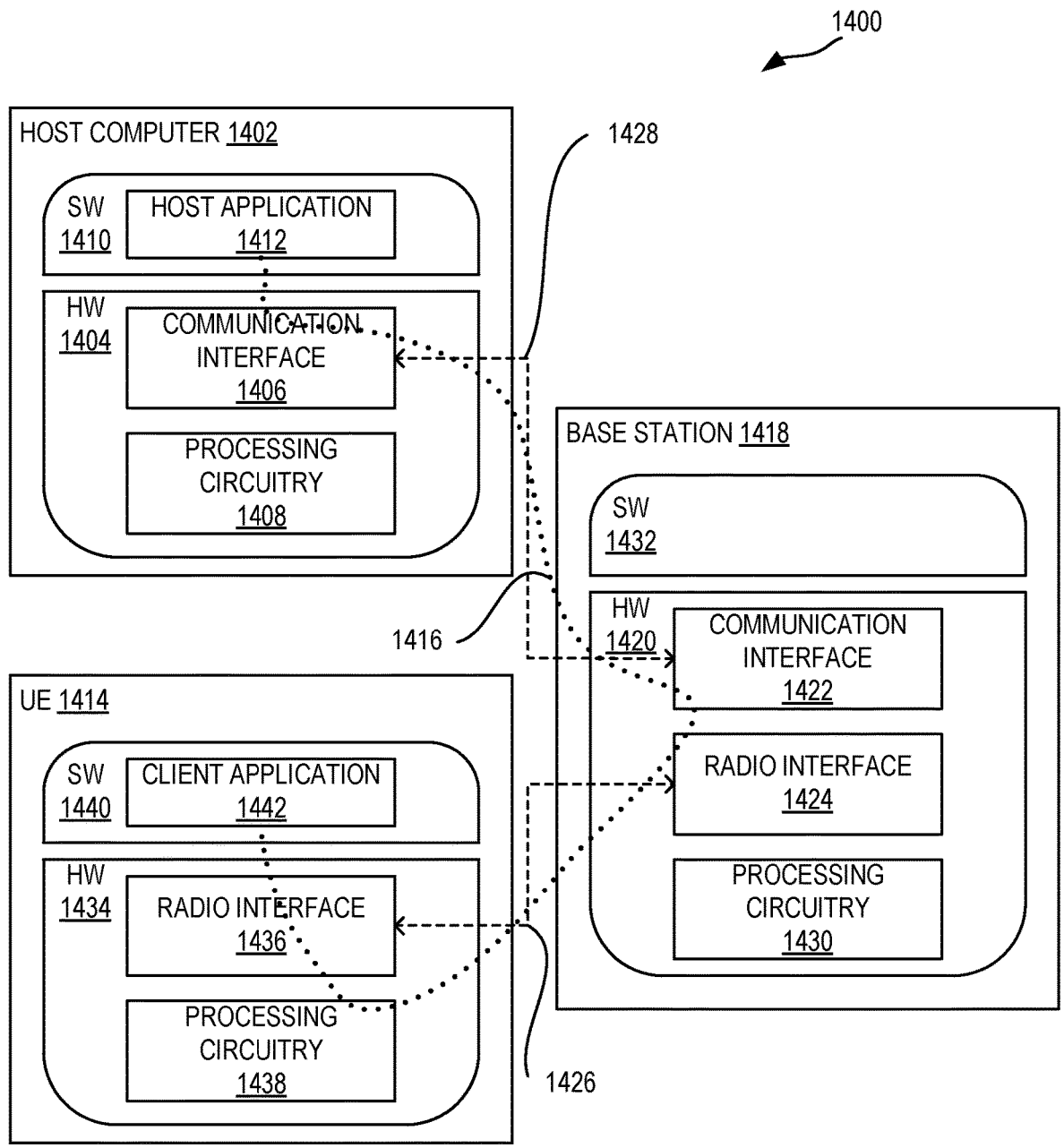
FIG. 14 illustrates example implementations of a UE, base station, and host computer according to some embodiments of the present disclosure.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

Figures 15, 16:
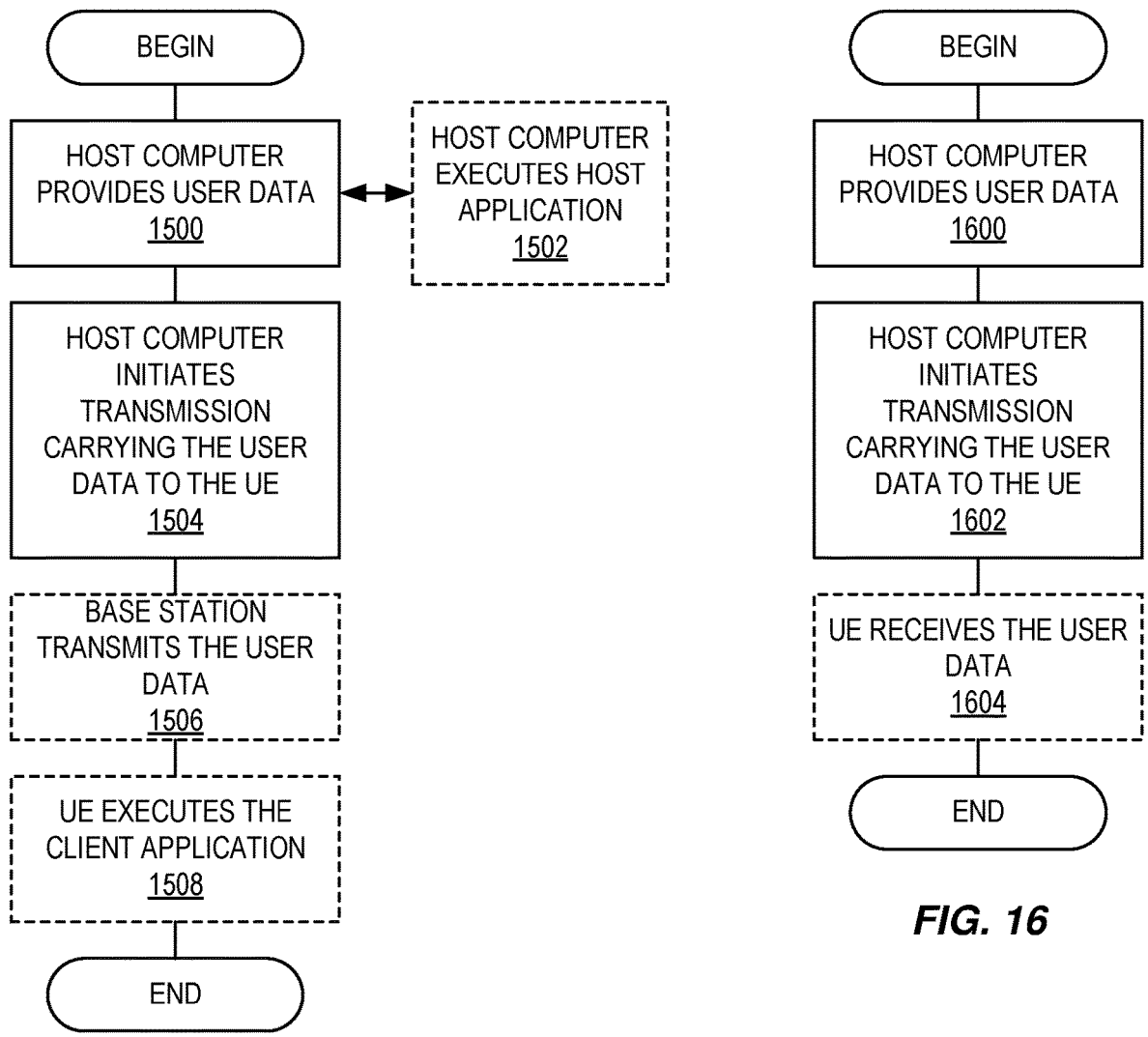
FIG. 15 is a flowchart illustrating a method implemented in a communication system according to some embodiments of the present disclosure.
FIG. 16 is a flowchart illustrating a method implemented in a communication system according to other embodiments of the present disclosure.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1 is a method performed by a wireless device for determining a validity of a timing advance configuration of the wireless device for an idle mode transmission, the method comprising:
　obtaining, while the wireless device is operating in a connected mode, a timing advance value for the wireless device;
　transitioning from the connected mode to an idle mode;
　performing a measurement on a serving cell of the wireless device while the wireless device is in the idle mode; and
　determining whether the timing advance is valid for an idle mode transmission based on the measurement.

Embodiment 2 is the method of embodiment 1, wherein determining whether the timing advance is valid for an idle mode transmission is further based on one or more of a change of serving cell for the wireless device, an idle mode time alignment timer for the wireless device, and/or a change in serving cell Reference Signal Received Power, RSRP.

Embodiment 3 is the method of embodiment 1 further comprising performing the idle mode transmission using the timing advance if the timing advance is determined to be valid.

Embodiment 4 is the method of embodiment 3 further comprising, if the timing advance is determined to not be valid:
　obtaining a new timing advance value for the wireless device; and
　performing a transmission using the new timing advance value.

Embodiment 5 is the method of any one of embodiments 1 to 4 wherein the measurement is a signal strength measurement.

Embodiment 6 is the method of any one of embodiments 1 to 4 wherein the measurement is a Reference Signal Received Power, RSRP, measurement.

Embodiment 7 is the method of any one of embodiments 1 to 4 wherein the measurement is a signal quality measurement.

Embodiment 8 is the method of any one of embodiments 1 to 4 wherein the measurement is a Reference Signal Received Quality, RSRQ, measurement.

Embodiment 9 is the method of any one of embodiments 1 to 8 wherein the measurement is a filtered measurement.

Embodiment 10 is the method of any one of embodiments 1 to 9 further comprising:
　performing, while the wireless device is in the Idle mode, one or more measurements on one or more neighbor cells of the wireless device;
　wherein determining whether the timing advance is valid for the idle mode transmission comprises determining whether the timing advance is valid for the idle mode transmission based on the measurement on the serving cell made while the wireless device is in the idle mode and the one or more measurements on the one or more neighbor cells made while the wireless device in in the idle mode.

Embodiment 11 is the method of any one of embodiments 1 to 9 wherein determining whether the timing advance is valid for the idle mode transmission based on the measurement comprises determining whether the timing advance is valid for the idle mode transmission based on a comparison of the measurement and a measurement threshold.

Embodiment 12 is the method of any one of embodiments 1 to 9 further comprising:
　performing, while the wireless device is in the connected mode, a measurement on the serving cell of the wireless device;
　wherein determining whether the timing advance is valid for the idle mode transmission comprises determining whether the timing advance is valid for the idle mode transmission based on the measurement on the serving cell made while the wireless device is in the connected mode and the measurement on the serving cell made while the wireless device is in the idle mode.

Embodiment 13 is the method of embodiment 12 wherein determining whether the timing advance is valid for the idle mode transmission based on the measurement on the serving cell made while the wireless device is in the connected mode and the measurement on the serving cell made while the wireless device is in the idle mode comprises:
　determining whether the timing advance is valid for the idle mode transmission based on a comparison of: (a) a difference between the measurement on the serving cell made while the wireless device is in the idle mode and the measurement on the serving cell made while the wireless device is in the connected mode and (b) a difference threshold.

Embodiment 14 is the method of any one of embodiments 1 to 9 further comprising:
　performing, while the wireless device is in the connected mode, a measurement on the serving cell of the wireless device;
　performing, while the wireless device is in the connected mode, measurements on one or more neighbor cells of the wireless device; and
　performing, while the wireless device is in the idle mode, measurements on the one or more neighbor cells of the wireless device;
　wherein determining whether the timing advance is valid for the idle mode transmission comprises determining whether the timing advance is valid for the idle mode transmission based on the measurement on the serving cell made while the wireless device is in the connected mode, the measurements on the one or more neighbor cells while the wireless device is in the connected mode, the measurement on the serving cell made while the wireless device is in the idle mode, and the measurements on the one or more neighbor cells while the wireless device is in the idle mode.

Embodiment 15 is the method of any of the previous embodiments, further comprising:
　providing user data; and
　forwarding the user data to a host computer via the transmission to a base station.

Embodiment 16 is a wireless device, the wireless device comprising:
　processing circuitry configured to perform any of the steps of any one of embodiments 1-15; and
　power supply circuitry configured to supply power to the wireless device.

Embodiment 17 is a User Equipment, UE, the UE comprising:
　an antenna configured to send and receive wireless signals;

radio front-end circuitry connected to the antenna and to processing circuitry, and configured to condition signals communicated between the antenna and the processing circuitry;

the processing circuitry being configured to perform any of the steps of any one of embodiments 1-15;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Embodiment 18 is a communication system including a host computer comprising:

processing circuitry configured to provide user data; and a communication interface configured to forward user data to a cellular network for transmission to a User Equipment, UE;

wherein the UE comprises a radio interface and processing circuitry, the UE's components configured to perform any of the steps of any one of embodiments 1-15.

Embodiment 19 is the communication system of the previous embodiment, wherein the cellular network further includes a base station configured to communicate with the UE.

Embodiment 20 is the communication system of the previous 2 embodiments, wherein:

the processing circuitry of the host computer is configured to execute a host application, thereby providing the user data; and the UE's processing circuitry is configured to execute a client application associated with the host application.

Embodiment 21 is a method implemented in a communication system including a host computer, a base station, and a User Equipment, UE, the method comprising:

at the host computer, providing user data; and at the host computer, initiating a transmission carrying the user data to the UE via a cellular network comprising the base station, wherein the UE performs any of the steps of any one of embodiments 1-15.

Embodiment 22 is the method of the previous embodiment, further comprising at the UE, receiving the user data from the base station.

Embodiment 23 is a communication system including a host computer comprising:

a communication interface configured to receive user data originating from a transmission from a User Equipment, UE, to a base station;

wherein the UE comprises a radio interface and processing circuitry, the UE's processing circuitry configured to perform any of the steps of any one of embodiments 1-15.

Embodiment 24 is the communication system of the previous embodiment, further including the UE.

Embodiment 25 is the communication system of the previous 2 embodiments, further including the base station, wherein the base station comprises a radio interface configured to communicate with the UE and a communication interface configured to forward to the host computer the user data carried by a transmission from the UE to the base station.

Embodiment 26 is the communication system of the previous 3 embodiments, wherein:

the processing circuitry of the host computer is configured to execute a host application; and the UE's processing circuitry is configured to execute a client application associated with the host application, thereby providing the user data.

Embodiment 27 is the communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

Embodiment 28 is a method implemented in a communication system including a host computer, a base station, and a User Equipment, UE, the method comprising:

at the host computer, receiving user data transmitted to the base station from the UE, wherein the UE performs any of the steps of any one of embodiments 1-15.

Embodiment 29 is the method of the previous embodiment, further comprising, at the UE, providing the user data to the base station.

Embodiment 30 is the method of the previous 2 embodiments, further comprising:

at the UE, executing a client application, thereby providing the user data to be transmitted; and at the host computer, executing a host application associated with the client application.

Embodiment 31 is the method of the previous 3 embodiments, further comprising:

at the UE, executing a client application; and at the UE, receiving input data to the client application, the input data being provided at the host computer by executing a host application associated with the client application;

wherein the user data to be transmitted is provided by the client application in response to the input data.

Embodiment 32 is a method implemented in a communication system including a host computer, a base station, and a User Equipment, UE, the method comprising:

at the host computer, receiving, from the base station, user data originating from a transmission which the base station has received from the UE, wherein the UE performs any of the steps of any one of embodiments 1-15.

Embodiment 33 is the method of the previous embodiment, further comprising at the base station, receiving the user data from the UE.

Embodiment 34 is the method of the previous 2 embodiments, further comprising at the base station, initiating a transmission of the received user data to the host computer.

Embodiment 35 is a method performed by a wireless device for determining a validity of a timing advance configuration of the wireless device for an idle mode transmission, the method comprising: performing a measurement on a serving cell of the wireless device while the wireless device is in the idle mode; and determining whether the timing advance is valid for an idle mode transmission based on the measurement.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
AP Access Point ASIC Application Specific Integrated Circuit
CP Cyclic Prefix
CPU Central Processing Unit
DSP Digital Signal Processor
eNB Enhanced or Evolved Node B
FPGA Field Programmable Gate Array
gNB New Radio Base Station
LTE Long Term Evolution
LTE-M Long Term Evolution Machine Type Communication
MME Mobility Management Entity
MTC Machine Type Communication
NB-IoT Narrowband Internet of Things
NPRACH Narrowband Physical Random Access Channel
NPSS Narrowband Primary Synchronization Signal
NR New Radio
NSSS Narrowband Secondary Synchronization Signal
OTT Over-the-Top
P-GW Packet Data Network Gateway
PRACH Physical Random Access Channel
PSS Primary Synchronization Signal
RAM Random Access Memory
RAN Radio Access Network
RAR Random Access Response
RAT Radio Access Technology
ROM Read Only Memory
RRH Remote Radio Head
RSRP Reference Signal Received Power
RSRQ Reference Signal Received Quality
RTT Round Trip Time
SCEF Service Capability Exposure Function
SSS Secondary Synchronization Signal
TA Timing Advance
TS Technical Specification
UE User Equipment
WID Work Item Description Those skilled in the art will recognize improvements and modifications to the embodiments of the present disclosure. All such improvements and modifications are considered within the scope of the concepts disclosed herein.

What is claimed is:

1. A method performed by a wireless device for determining a validity of a timing advance configuration of the wireless device for an idle mode transmission, the method comprising:
   obtaining, while the wireless device is operating in a connected mode, a timing advance value for the wireless device; transitioning from the connected mode to an idle mode;
   performing a measurement on a serving cell of the wireless device while the wireless device is in the idle mode;
   determining whether the timing advance configuration is valid for the idle mode transmission based on the measurement performed by the wireless device in the idle mode; and
   performing the idle mode transmission using the timing advance value if the timing advance configuration is determined to be valid by the wireless device in the idle mode.

2. The method of claim 1, wherein determining whether the timing advance configuration is valid for the idle mode transmission is further based on one or more of a change of serving cell for the wireless device, and/or an idle mode time alignment timer for the wireless device.

3. The method of claim 2 further comprising, if the timing advance configuration is determined to not be valid:
   obtaining a new timing advance value for the wireless device; and performing a transmission using the new timing advance value.

4. The method of claim 1, wherein the measurement is a signal strength measurement or signal quality measurement.

5. The method of claim 1, wherein the measurement is a Reference Signal Received Power (RSRP) measurement.

6. The method of claim 1, wherein determining whether the timing advance configuration is valid for the idle mode transmission is further based on a change in serving cell RSRP.

7. The method of claim 1, wherein the measurement is a Reference Signal Received Quality (RSRQ) measurement.

8. The method of claim 1, wherein the measurement is a filtered measurement.

9. The method of claim 1, further comprising:
   performing, while the wireless device is in the idle mode, one or more measurements on one or more neighbor cells of the wireless device; wherein determining whether the timing advance configuration is valid for the idle mode transmission comprises determining whether the timing advance configuration is valid for the idle mode transmission based on the measurement on the serving cell made while the wireless device is in the idle mode and the one or more measurements on the one or more neighbor cells made while the wireless device is in the idle mode.

10. The method of claim 1, wherein determining whether the timing advance configuration is valid for the idle mode transmission based on the measurement comprises determining whether the timing advance configuration is valid for the idle mode transmission based on a comparison of the measurement and a measurement threshold.

11. The method of claim 1, further comprising: performing, while the wireless device is in the connected mode, a measurement on the serving cell of the wireless device; wherein determining whether the timing advance configuration is valid for the idle mode transmission comprises determining whether the timing advance configuration is valid for the idle mode transmission based on the measurement on the serving cell made while the wireless device is in the connected mode and the measurement on the serving cell made while the wireless device is in the idle mode.

12. The method of claim 11, wherein determining whether the timing advance configuration is valid for the idle mode transmission based on the measurement on the serving cell made while the wireless device is in the connected mode and the measurement on the serving cell made while the wireless device is in the idle mode comprises:
   determining whether the timing advance configuration is valid for the idle mode transmission based on a comparison of: (a) a difference between the measurement on the serving cell made while the wireless device is in the idle mode and the measurement on the serving cell made while the wireless device is in the connected mode and (b) a difference threshold.

13. A method performed by a wireless device for determining a validity of a timing advance configuration of the wireless device for an idle mode transmission, the method comprising:
   obtaining, while the wireless device is operating in a connected mode, a timing advance value for the wireless device;
   performing, while the wireless device is in the connected mode, a measurement on a serving cell of the wireless device;

performing, while the wireless device is in the connected mode, measurements on one or more neighbor cells of the wireless device;

transitioning from the connected mode to an idle mode;

performing another measurement on the serving cell of the wireless device while the wireless device is in the idle mode;

performing, while the wireless device is in the idle mode, measurements on the one or more neighbor cells of the wireless device; and determining whether the timing advance configuration is valid for an idle mode transmission based on:

the measurement on the serving cell made while the wireless device is in the connected mode, the measurements on the one or more neighbor cells while the wireless device is in the connected mode, the other measurement on the serving cell made while the wireless device is in the idle mode, and the measurements on the one or more neighbor cells while the wireless device is in the idle mode.

14. A User Equipment (UE) comprising:

an antenna configured to send and receive wireless signals; radio front-end circuitry connected to the antenna and to processing circuitry, and configured to condition signals communicated between the antenna and the processing circuitry;

the processing circuitry being configured to perform operations comprising: obtaining a timing advance value for the UE while the UE is operating in a connected mode; transitioning from the connected mode to an idle mode; performing a measurement on a serving cell of the UE while the UE is in the idle mode; determining, while in the idle mode, whether a timing advance configuration is valid for an idle mode transmission based on the measurement; and performing the idle mode transmission using the timing advance value if the timing advance configuration is determined to be valid; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

15. A method performed by a wireless device for determining a validity of a timing advance configuration of the wireless device for an idle mode transmission, the method comprising:

performing a measurement on a serving cell of the wireless device while the wireless device is in the idle mode;

determining whether the timing advance configuration is valid for an idle mode transmission based on the measurement; and performing the idle mode transmission using a timing advance value if the timing advance configuration is determined to be valid.

16. The UE of claim 14, wherein determining whether the timing advance configuration is valid for the idle mode transmission is further based on a change in serving cell RSRP.

* * * * *